United States Patent
Aoyama

(10) Patent No.: US 10,526,930 B2
(45) Date of Patent: Jan. 7, 2020

(54) VALVE TIMING CONTROL SYSTEM AND CONTROL COMMAND UNIT

(71) Applicant: DENSO CORPORATION, Kariya, Aichi-pref. (JP)

(72) Inventor: Koichi Aoyama, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 16/069,617

(22) PCT Filed: Jan. 27, 2017

(86) PCT No.: PCT/JP2017/002850
§ 371 (c)(1),
(2) Date: Jul. 12, 2018

(87) PCT Pub. No.: WO2017/159066
PCT Pub. Date: Sep. 21, 2017

(65) Prior Publication Data
US 2019/0010838 A1 Jan. 10, 2019

(30) Foreign Application Priority Data

Mar. 16, 2016 (JP) ................................. 2016-052946

(51) Int. Cl.
*F01L 1/34* (2006.01)
*F01L 1/344* (2006.01)
*F02D 13/02* (2006.01)

(52) U.S. Cl.
CPC ........ *F01L 1/3442* (2013.01); *F02D 13/0219* (2013.01); *F01L 2001/34456* (2013.01); *F01L 2001/34469* (2013.01)

(58) Field of Classification Search
CPC .......... F01L 1/3442; F01L 2001/34456; F02D 13/0219
USPC ............................................ 123/90.15, 90.17
See application file for complete search history.

(56) References Cited

U.S. PATENT DOCUMENTS

| | | | |
|---|---|---|---|
| 8,800,515 B1 * | 8/2014 | Smith ................. | F01L 1/34409 |
| | | | 123/90.17 |
| 2002/0166522 A1 | 11/2002 | Takahashi et al. | |
| 2003/0196622 A1 | 10/2003 | Wada et al. | |
| 2005/0098130 A1 | 5/2005 | Hirowatari et al. | |

* cited by examiner

Primary Examiner — Ching Chang
(74) Attorney, Agent, or Firm — Nixon & Vanderhye P.C.

(57) ABSTRACT

In a valve timing control system, a control command unit includes: a first stage setting block and a next stage setting block. The first stage setting block sets a retard holding command value as a control command value to introduce hydraulic fluid to each retard operation chamber under a state where a rotation phase is locked, to start applying an operation pressure more than or equal to an unlock pressure to a lock component. The next stage setting block sets an advance holding command value as a control command value to introduce hydraulic fluid to each advance operation chamber, after setting the retard holding command value, to maintain the applying of the operation pressure more than or equal to the unlock pressure to the lock component.

11 Claims, 18 Drawing Sheets ns

VALVE TIMING CONTROL SYSTEM AND CONTROL COMMAND UNIT

CROSS REFERENCE TO RELATED APPLICATION

This application is the U.S. national phase of International Application No. PCT/JP2017/002850 flied on Jan. 27, 2017 which designated the U.S. and claims priority to Japanese Patent Application No. 2016-52946 filed on Mar. 16, 2016, the entire contents of each of which are incorporated herein by reference.

TECHNICAL FIELD

The present disclosure relates to a valve timing control system and a control command unit that variably controls valve timing of a valve opened and closed by a camshaft by a torque transfer from a crankshaft in an internal-combustion engine, in response to a rotation phase of the camshaft to the crankshaft.

BACKGROUND ART

Conventionally, a valve timing control system is widely known, which controls a phase adjustment unit and a lock unit by collaboration of a control valve and a command unit. The phase adjustment unit adjusts a rotation phase between a crankshaft and a camshaft. The lock unit can lock the rotation phase.

For example, in a system disclosed by Patent Literature 1, a phase adjustment unit and a lock unit are driven by hydraulic fluid such as oil. Specifically, the phase adjustment unit has an advance side oil pressure chamber and a retard side oil pressure chamber, between rotors rotating with a crankshaft and a camshaft, respectively. A torque generating direction is opposite between the advance side oil pressure chamber and the retard side oil pressure chamber, when changing the rotation phase in response to introduction of oil. The phase adjustment unit adjusts the rotation phase based on the flow in/out of oil to the advance side oil pressure chamber and the retard side oil pressure chamber. The lock unit has a lock pin between the rotors of the phase adjustment unit. Oil pressure is applied to the lock pin from an unlock oil pressure chamber to which oil flows in/out through the advance side oil pressure chamber. The lock unit unlocks the rotation phase when an oil pressure more than or equal to an unlock pressure is impressed to the lock pin, in a state where the rotation phase is locked in which the oil pressure impressed to the lock pin is less than the unlock pressure. In the system disclosed in Patent Literature 1, the flow in/out of oil to the advance side oil pressure chamber and the retard side oil pressure chamber is controlled by operating a control valve based on a current value set by the control command unit, to drive the phase adjustment unit and the lock unit.

In the system of Patent Literature 1, the current value for starting the impression of operation pressure more than or equal to the unlock pressure to the unlock oil pressure chamber, in the state where the rotation phase is locked, may be set to a value that can change the rotation phase by introducing oil to the advance side oil pressure chamber. However, if the oil pressure of the advance side oil pressure chamber increases rapidly before the unlocking, the rotation phase may be rapidly changed to affect the lock pin between the rotors. Then, a subsequent valve timing adjustment may be affected.

In the system of Patent Literature 1, the current value is set for starting the applying of the operation pressure low enough not to change the rotation phase as an unlock pressure. Thereby, it is possible to avoid a faulty operation of the lock pin that is caused by a change in rotation phase before the unlocking.

PRIOR ART LITERATURES

Patent Literature

Patent Literature 1: JP 3755655 B2

SUMMARY OF INVENTION

However, in the system of Patent Literature 1, in case where the viscosity of oil is raised by low temperature, the oil pressure which acts on the lock pin does not easily increase, or the sliding resistance of the lock pin becomes large between the rotors. In this case, the lock pin may have some troubles because the motion of the lock pin delays.

It is an object of the present disclosure to provide a valve timing control system and a control command unit in which an incomplete operation caused by an unlocking operation can be restricted.

According to an aspect of the present disclosure, a valve timing control system that variably controls valve timing of a valve opened and closed by a camshaft by a torque transfer from a crankshaft in an internal-combustion engine in response to a rotation phase of the camshaft to the crankshaft, the valve timing control system including:

a phase adjustment unit including a first operation chamber and a second operation chamber between rotors respectively rotating with the crankshaft and the camshaft, the phase adjustment unit adjusting the rotation phase by a flow in/out of hydraulic fluid to the first operation chamber and the second operation chamber, a generating direction of a torque for changing the rotation phase in response to introduction of hydraulic fluid being opposite between the first operation chamber and the second operation chamber;

a lock unit having a lock component between the rotors, an operation pressure being impressed from an unlock chamber to the lock component, hydraulic fluid flowing in/out the unlock chamber through the first operation chamber, the lock unit unlocking the rotation phase when the operation pressure more than or equal to the unlock pressure is impressed to the lock component under a state where the rotation phase is locked by the operation pressure impressed to the lock component that is less than the unlock pressure;

a control valve that controls the flow in/out of hydraulic fluid to the first operation chamber and the second operation chamber based on a control command value; and a control command unit that sets the control command value.

The control command unit has a first stage setting block that sets a first stage command value as the control command value to introduce the hydraulic fluid to the first operation chamber under the state where the rotation phase is locked, to start applying the operation pressure more than or equal to the unlock pressure to the lock component, and a next stage setting block that sets a next stage command value as the control command value to introduce the hydraulic fluid to the second operation chamber, after setting the first stage command value, to maintain the applying of the operation pressure more than or equal to the unlock pressure to the lock component.

According to an aspect of the present disclosure, the control command unit sets the control command value in the valve timing control system that variably controls valve timing of a valve opened and closed by a camshaft by a torque transfer from a crankshaft in an internal-combustion engine in response to a rotation phase of the camshaft to the crankshaft.

The valve timing control system includes:

a phase adjustment unit including a first operation chamber and a second operation chamber between rotors respectively rotating with the crankshaft and the camshaft, the phase adjustment unit adjusting the rotation phase by a flow in/out of hydraulic fluid to the first operation chamber and the second operation chamber, a generating direction of a torque for changing the rotation phase in response to introduction of hydraulic fluid being opposite between the first operation chamber and the second operation chamber;

a lock unit having a lock component between the rotors, an operation pressure being impressed to the lock component from an unlock chamber, hydraulic fluid flowing in/out the unlock chamber through the first operation chamber, the lock unit unlocking the rotation phase when the operation pressure more than or equal to the unlock pressure is impressed to the lock component under a state where the rotation phase is locked by the operation pressure impressed to the lock component that is less than the unlock pressure; and a control valve that controls the flow in/out of hydraulic fluid to the first operation chamber and the second operation chamber based on a control command value.

The control command unit has a first stage setting block that sets a first stage command value as the control command value to introduce the hydraulic fluid to the first operation chamber under the state where the rotation phase is locked, to start applying the operation pressure more than or equal to the unlock pressure to the lock component, and a next stage setting block that sets a next stage command value as the control command value to introduce the hydraulic fluid to the second operation chamber, after setting the first stage command value, to maintain the applying of the operation pressure more than or equal to the unlock pressure to the lock component.

The first stage setting block of the control command unit sets the first stage command value to introduce hydraulic fluid to the first operation chamber to start applying the operation pressure more than or equal to the unlock pressure to the lock component under a state where the rotation phase is locked. Therefore, even in a case where the operation pressure which acts on the lock component does not increase easily or even when the sliding resistance of the lock component is large, since the operation pressure can be raised as much as possible in the unlock chamber into which hydraulic fluid is introduced through the first operation chamber, the delay in motion of the lock component can be restricted.

Moreover, after the setup of the first stage command value by the first stage setting block, the next stage setting block of the control command unit sets the next stage command value to introduce hydraulic fluid to the second operation chamber so that the impression of operation pressure more than or equal to the unlock pressure to the lock component can be maintained. Therefore, a torque can be generated by hydraulic fluid introduced to the second operation chamber based on the next stage command value, in a direction opposite from the torque for changing the rotation phase in response to the introduction of hydraulic fluid to the first operation chamber based on the first stage command value, under the state where the function of restricting the delay in motion of the lock component is maintained. Therefore, the lock component can quickly unlock the rotation phase while the rotation phase is restricted from changing before the unlocking. Thus, the lock component is free from a fault operation caused by the unlocking operation.

Furthermore, the control command unit may further include:

a confirmation stage setting block that sets a confirmation stage command value as a control command value to introduce hydraulic fluid to the first operation chamber, so as to confirm the unlocking of the rotation phase after the setup of the next stage command value.

The confirmation stage setting block of the control command unit sets the confirmation stage command value to introduce hydraulic fluid to the first operation chamber, so as to confirm the unlocking after the setup of the next stage command value. It can be confirmed whether the unlocking is completed by the introduction of hydraulic fluid to the second operation chamber in response to the next stage command value, based on whether the rotation phase is changed by the introduction of hydraulic fluid to the first operation chamber in response to the confirmation stage command value. Therefore, the lock component can be free from troubles caused by excessive change in the rotation phase when confirming the unlocking.

DESCRIPTION OF EMBODIMENTS

Figure 1:
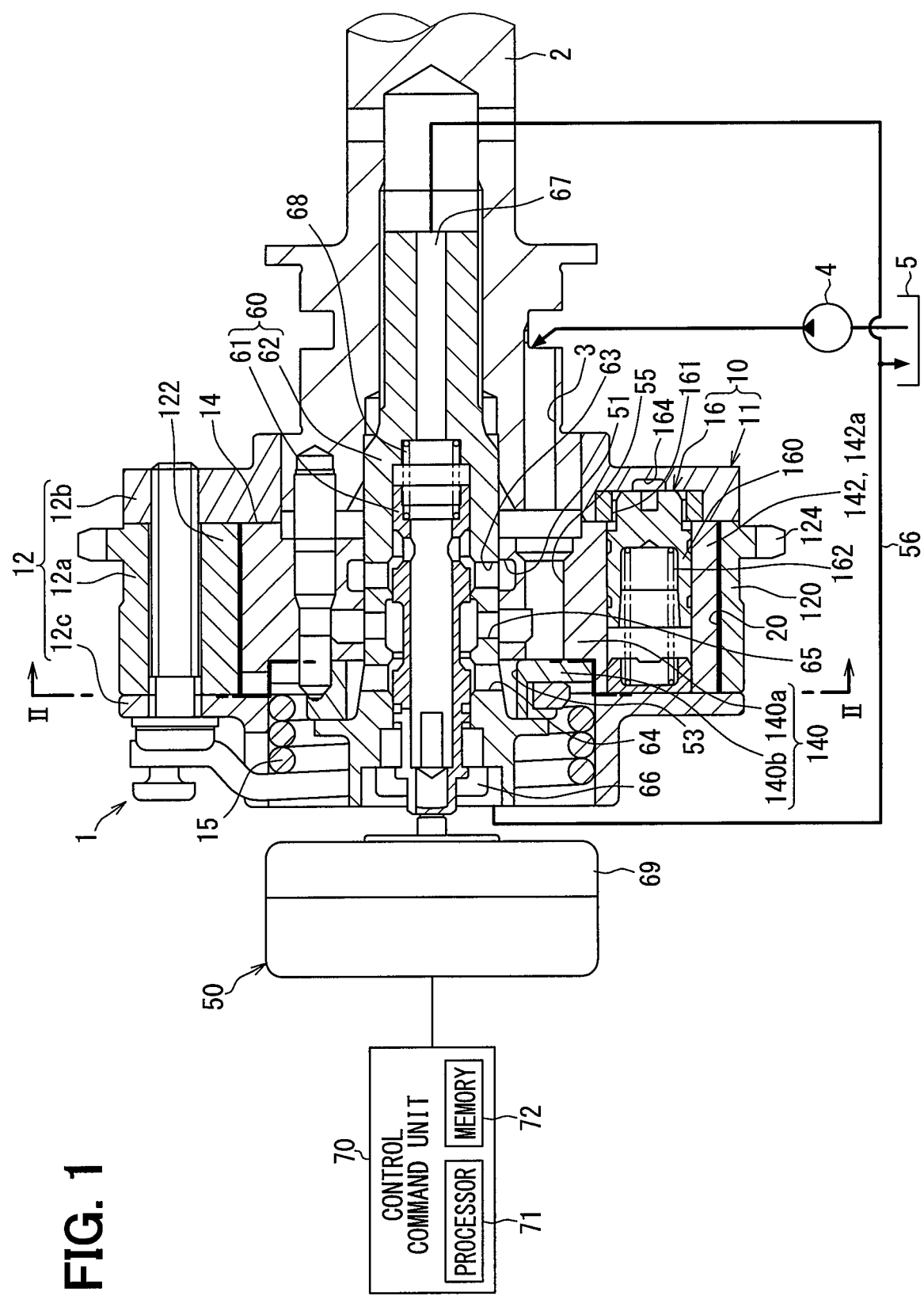
FIG. 1 is a sectional view illustrating a valve timing system according to a first embodiment, taken along a line I-I of FIG. 2.

Embodiments will be described hereafter referring to drawings. In the embodiments, a part that corresponds to a matter described in a preceding embodiment may be assigned with the same reference numeral, and redundant explanation for the part may be omitted. When only a part of a configuration is described in an embodiment, another preceding embodiment may be applied to the other parts of the configuration. The parts may be combined even if it is not explicitly described that the parts can be combined. The embodiments may be partially combined even if it is not explicitly described that the embodiments can be combined, provided there is no harm in the combination.

First Embodiment

As shown in FIG. 1, a valve timing control system 1 according to a first embodiment variably controls valve timing of, for example, an exhaust valve as a valve opened and closed by a camshaft 2 by transfer of a crank torque from a crankshaft in an internal-combustion engine of a vehicle. The system 1 uses an engine lubricating oil supplied from a pump 4 for lubricating the internal-combustion engine as hydraulic fluid, to realize a suitable valve timing according to the rotation phase of the camshaft 2 to the crankshaft. Specifically, the system 1 includes a rotation mechanism unit 10 and a control unit 50 shown in FIGS. 1 and 2.

(Rotation Mechanism Unit)

The rotation mechanism unit 10 is installed in a communication channel through which the crank torque is transmitted to the camshaft 2 from the crankshaft. The rotation mechanism unit 10 includes a phase adjustment unit 11 in which an assisting spring 15 is combined with a housing rotor 12 and a vane rotor 14.

The housing rotor 12 has a shoe housing 12a, and a cam side plate 12b and a spring side plate 12c are fixed to the axial ends of the shoe housing 12a, respectively. The shoe housing 12a has a housing body 120, plural shoes 122, and a sprocket 124.

The shoes 122, each of which having an approximately sector shape and projected from the cylindrical housing body 120 inward in the radial direction, are spaced from each other in the rotating direction with a predetermined interval. A housing chamber 20 is formed between the shoes 122 adjacent to each other in the rotating direction. The sprocket 124 is formed around the perimeter part of the housing body 120. The sprocket 124 is engaged with the crankshaft through a timing chain. Thereby, the crank torque is transmitted to the sprocket 124 from the crankshaft during the operation of the internal-combustion engine (namely, under the rotation), such that the housing rotor 12 rotates with the crankshaft in a fixed direction (namely, clockwise in FIG. 2, according to this embodiment).

The vane rotor 14 is coaxially housed in the housing rotor 12. The vane rotor 14 has the ends in the axial direction that are in sliding contact with, respectively, the cam side plate 12b and the spring side plate 12c. The vane rotor 14 has the rotation shaft 140 and plural vanes 142.

The rotation shaft 140 is coaxially connected to the camshaft 2 through a main hole of the cam side plate 12b. The vane rotor 14 rotates with the camshaft 2 in the same direction as the housing rotor 12 (namely, clockwise in FIG. 2, according to this embodiment), and is able to rotate relative to the housing rotor 12.

The rotation shaft 140 has a body part 140a and a spring receiving part 140b connected with an end part of the body part 140a in the axial direction. The spring receiving part 140b is exposed out of the housing rotor 12 through a main hole of the spring side plate 12c. The assisting spring 15 made of a torsion coil spring is interposed between the spring receiving part 140b and the spring side plate 12c. The assisting spring 15 generates a restoring force so that the vane rotor 14 is biased in the advance direction to the housing rotor 12.

Figure 2:
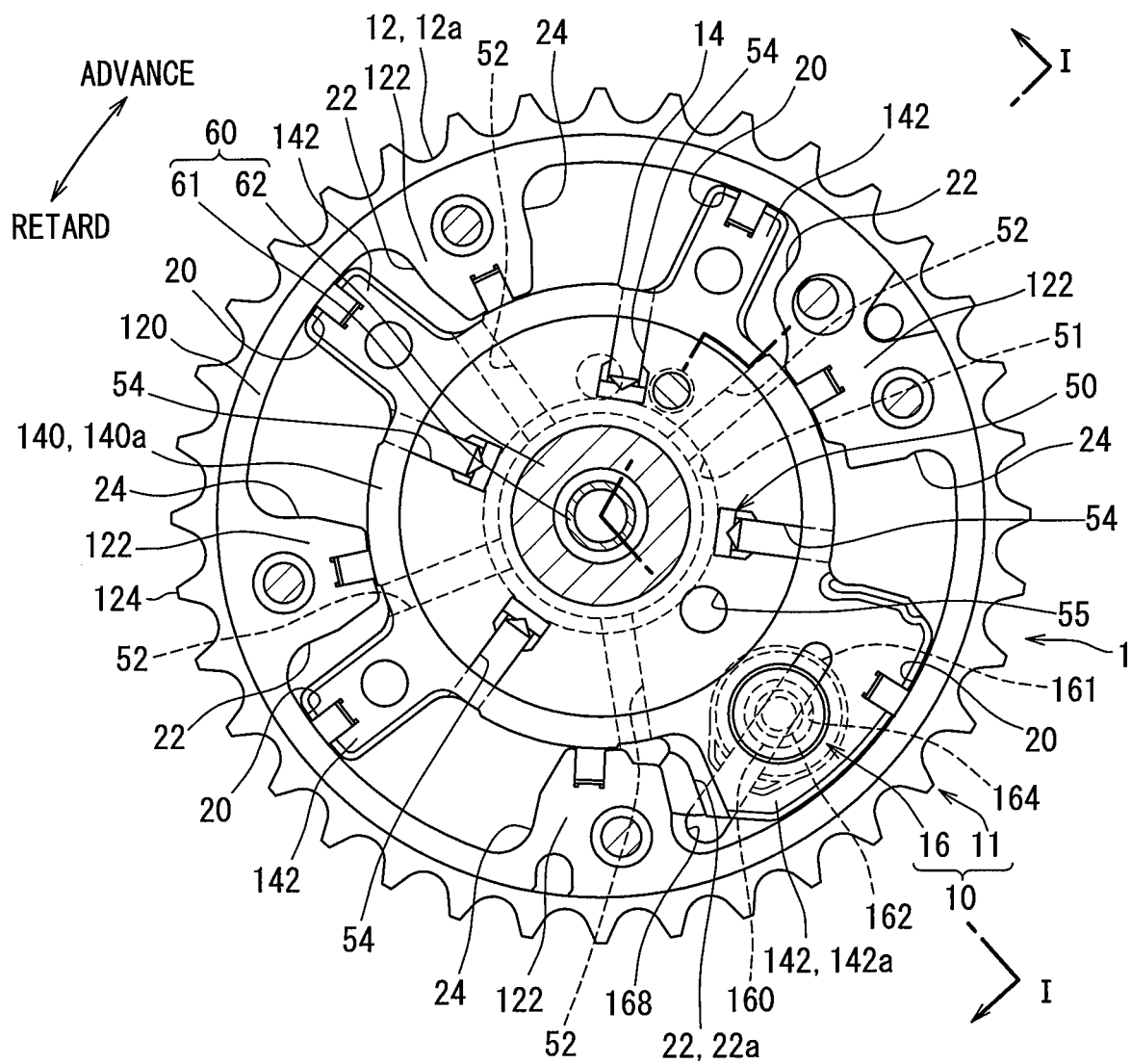
FIG. 2 is a cross-sectional view taken along a line II-II of FIG. 1.

As shown in FIGS. 1 and 2, the vanes 142, each of which having an approximately sector shape and projected outward in the radial direction, are arranged on the rotation shaft 140 in the rotating direction with a predetermined interval. Each vane 142 is housed in the corresponding housing chamber 20, and divides the corresponding housing chamber 20 in the rotating direction, as shown in FIG. 2. A retard operation chamber 22 is formed between the vane 142 and the shoe 122 in the advance direction, as a "first operation chamber" under this partition state. An advance operation chamber 24 is formed between the vane 142 and the shoe 122 in the retard direction, as a "second operation chamber".

Thus, the phase adjustment unit 11 has the plural retard operation chambers 22 and the plural advance operation chambers 24 alternately in the rotating direction, between the vane rotor 14 and the housing rotor 12. Thereby, the generating direction of the torque for changing the rotation phase in response to introduction of hydraulic fluid is reverse between the retard operation chamber 22 and the advance operation chamber 24. In the phase adjustment unit 11, the rotation phase is adjusted by the flow in/out of hydraulic fluid to each retard operation chamber 22 and each advance operation chamber 24 to determine the valve timing.

Figure 3:
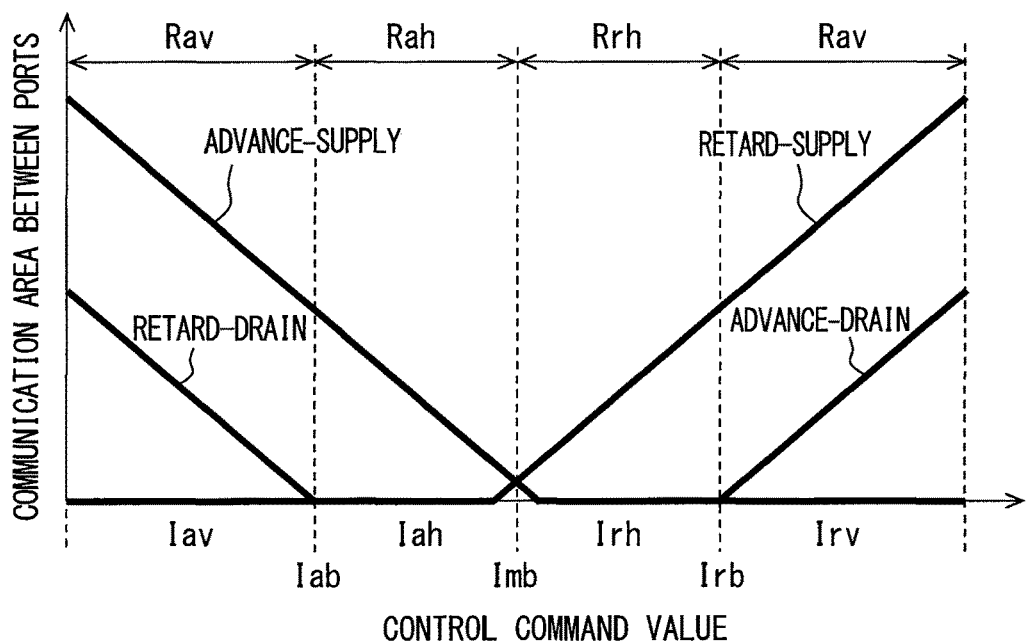
FIG. 3 is a characteristic view for explaining a control command value set by a control command unit of the first embodiment.

In a retard variable domain RN of FIG. 3 where hydraulic fluid is discharged from each advance operation chamber 24 and hydraulic fluid is introduced to each retard operation chamber 22, a retard torque occurs in the direction retarding the vane rotor 14 to the housing rotor 12, such that the rotation phase is changed in the retard direction. In a retard holding domain Rrh of FIG. 3 where the flow in/out of hydraulic fluid to each advance operation chamber 24 is regulated, and hydraulic fluid is introduced into each retard operation chamber 22, while the retard torque is generated, the rotation phase is maintained, that is, not changed by the introduction of hydraulic fluid.

In an advance variable domain Rav of FIG. 3 where hydraulic fluid is discharged from each retard operation chamber 22 and hydraulic fluid is introduced to each advance operation chamber 24, an advance torque occurs in the direction advancing the vane rotor 14 to the housing rotor 12, such that the rotation phase is changed in the advance direction. In an advance holding domain Rah of FIG. 3 where the flow in/out of hydraulic fluid to each retard operation chamber 22 is regulated and hydraulic fluid is introduced into each advance operation chamber 24, while the advance torque is generated, the rotation phase is maintained, that is, not changed by the introduction of hydraulic fluid.

As shown in FIGS. 1 and 2, the rotation mechanism unit 10 further includes a lock unit 16 in the phase adjustment unit 11. The lock unit 16 has a lock component 160, a lock hole 161, an elastic component 162, and an unlock chamber 164.

The cylindrical lock component 160 is supported by a specific one of the vanes 142a so that both-way movement is possible. A lock hole 161 is formed in the cam side plate 12b at a specific part in the rotating direction, and has a cylinder hole shape with a bottom. In FIG. 2 that represents the maximum advance phase in which the vane rotor 14 is located the most advance position to the housing rotor 12, the lock component 160 is fitted to the lock hole 161, between the rotors 12 and 14, as shown in FIG. 1, such that the rotation phase is locked at the maximum advance phase as a lock phase. The rotation phase is unlocked when the lock component 160 is separated from the lock hole 161 between the rotors 12 and 14.

As shown in FIGS. 1 and 2, the elastic component 162 such as compression coil spring is interposed between the lock component 160 and the vane 142a. The elastic component 162 generates restoring force so that the lock component 160 is biased toward the cam side plate 12b.

The unlock chamber 164 to which hydraulic fluid flows in/out is always secured between the lock component 160 and the cam side plate 12b. The unlock chamber 164 communicates with a specific one of the retard operation chambers 22a through a lock passage 168 defined in the cam side plate 12b. Thereby, the hydraulic fluid can flow in/out of the unlock chamber 164 through the retard operation chamber 22a. An operation pressure, which is pressure of the hydraulic fluid introduced to the unlock chamber 164, is impressed to the lock component 160, such that a driving force acts to the lock component 160 toward the spring side plate 12c against the restoring force of the elastic component 162.

Under the state where the rotation phase is locked at the maximum advance phase as shown in FIG. 1, when the operation pressure impressed to the unlock chamber 164 by the introduction of the hydraulic fluid to the unlock chamber 164 becomes more than or equal to a predetermined unlock pressure, the lock component 160 is separated from the lock hole 161. Thus, when the rotation phase is unlocked from the maximum advance phase, the rotation phase can be adjusted by the phase adjustment unit 11 and the variable control of valve timing is permitted. In contrast, when the operation pressure impressed to the unlock chamber 164 becomes less than the unlock pressure, due to the discharge of the hydraulic fluid from the unlock chamber 164, the lock component 160 is fitted to the lock hole 161 at the maximum advance phase, as shown in FIG. 1. Thus, when the rotation phase is locked at the maximum advance phase, the adjustment of the rotation phase by the phase adjustment unit 11 and the variable control of valve timing are restricted.

(Control System)

The control unit 50 controls the flow in/out of hydraulic fluid to each retard operation chamber 22 and each advance operation chamber 24 to drive the rotation mechanism unit 10. As shown in FIGS. 1 and 2, the control unit 50 has a retard main passage 51, a retard branch passage 52, an advance main passage 53, an advance branch passage 54, a supply passage 55, a drain passage 56, a control valve 60, and a control command unit 70.

The retard main passage 51 is located around the inner circumference part of the body part 140a of the rotation shaft 140. The plural retard branch passages 52 penetrate the body part 140a of the rotation shaft 140. Each retard branch passage 52 causes the corresponding retard operation chamber 22 and the common retard main passage 51 to communicate with each other. The advance main passage 53 is located around the inner circumference part of the spring receiving part 140b of the rotation shaft 140. The plural advance branch passages 54 penetrate the body part 140a of the rotation shaft 140. Each advance branch passage 54 causes the corresponding advance operation chamber 24 and the common advance main passage 53 to communicate with each other.

The supply passage 55 penetrates the body part 140a of the rotation shaft 140. The supply passage 55 communicates with the pump 4 through a conveyance passage 3, shown in FIG. 1, in the internal-combustion engine. The pump 4 is a mechanical pump rotated by receiving crank torque from the crankshaft with operation of the internal-combustion engine. The pump 4 driven to rotate continuously discharges the hydraulic fluid from the drain pan 5. The conveyance passage 3 which penetrates the camshaft 2 causes the discharge port of the pump 4 and the supply passage 55 to communicate with each other. Thereby, the conveyance passage 3 sends the hydraulic fluid from the pump 4 to the supply passage 55 during the operation of the internal-combustion engine.

The drain passage 56 is located outside of the rotation mechanism unit 10 and the camshaft 2. The drain passage 56 and the drain pan 5 are opened to the atmosphere as a drain collecting section. The drain passage 56 can discharge hydraulic fluid toward the drain pan 5.

As shown in FIGS. 1 and 2, the control valve 60 is what is called a spool valve having a spool 61 moving both-way in the axial direction in the sleeve 62. The control valve 60 of this embodiment is located inside both of the vane rotor 14 and the camshaft 2. Alternatively, the control valve may be located in one of the vane rotor 14 and the camshaft 2, and may be located outside of the vane rotor 14 and the camshaft 2.

As shown in FIG. 1, the retard port 63, the advance port 64, the supply port 65, and the drain port 66, 67 are defined in the sleeve 62. The retard port 63 communicates with the retard main passage 51, and the advance port 64 communicates with the advance main passage 53. The supply port 65 communicates with the supply passage 55, and each drain port 66, 67 communicates with the common drain passage 56. The control valve 60 adjusts the communication area between the ports 63, 64, 65, 66, 67, as shown in FIG. 3, according to the position of the spool 61. Thereby, the control valve 60 can control individually the flow in/out of hydraulic fluid to each retard operation chamber 22 and the flow in/out of hydraulic fluid to each advance operation chamber 24.

In the control valve 60 shown in FIG. 1, the position of the spool 61 is changed by the balance between the restoring force generated by the elastic deformation of the return spring 68 and the driving force generated by supplying electric power to the drive source 69. Then, as shown in FIG. 3, the control valve 60 changes the position of the spool 61 to adjust the communication area between the ports 63, 64, 65, 66, 67, based on the control command value I, such as a duty value or current value that determines the current supplied to the drive source 69, or a stroke value of the spool 61, such that the flow in/out of hydraulic fluid to each retard operation chamber 22 and each advance operation chamber 24 is controlled.

As shown in FIG. 1, the control command unit 70 is what is called an ECU including a microcomputer with a processor 71 and a memory 72. The control command unit 70 is connected to various electronic parts of the vehicle and the drive source 69 of the control valve 60. The control command unit 70 controls the operation of the control valve 60 and the operation of the internal-combustion engine. The control command unit 70 sets the control command value I given to the drive source 69, as shown in FIG. 3, in order to control the flow in/out of hydraulic fluid to each retard operation chamber 22 and each advance operation chamber 24.

Specifically, the control command unit 70 sets a retard variable command value Irv, as the control command value I in the retard variable domain Rrv, to discharge hydraulic fluid from each advance operation chamber 24 and to introduce hydraulic fluid to each retard operation chamber 22. The control command unit 70 sets a retard holding command value Irh, as the control command value I in the retard holding domain Rrh, to regulate the flow in/out of hydraulic fluid to each advance operation chamber 24 and to introduce hydraulic fluid to each retard operation chamber 22.

The control command unit 70 sets an advance variable command value Iav, as the control command value I in the advance variable domain Rav, to introduce hydraulic fluid to each advance operation chamber 24 and to discharge hydraulic fluid from each retard operation chamber 22. The control command unit 70 sets an advance holding command value Iah, as the control command value I in the advance holding domain Rah, to regulate the flow in/out of hydraulic fluid to each retard operation chamber 22 and to introduce hydraulic fluid to each advance operation chamber 24.

(Unlock Processing by Control Command Unit)

An unlock processing by the control command unit 70 is explained in detail hereafter.

Figure 4:
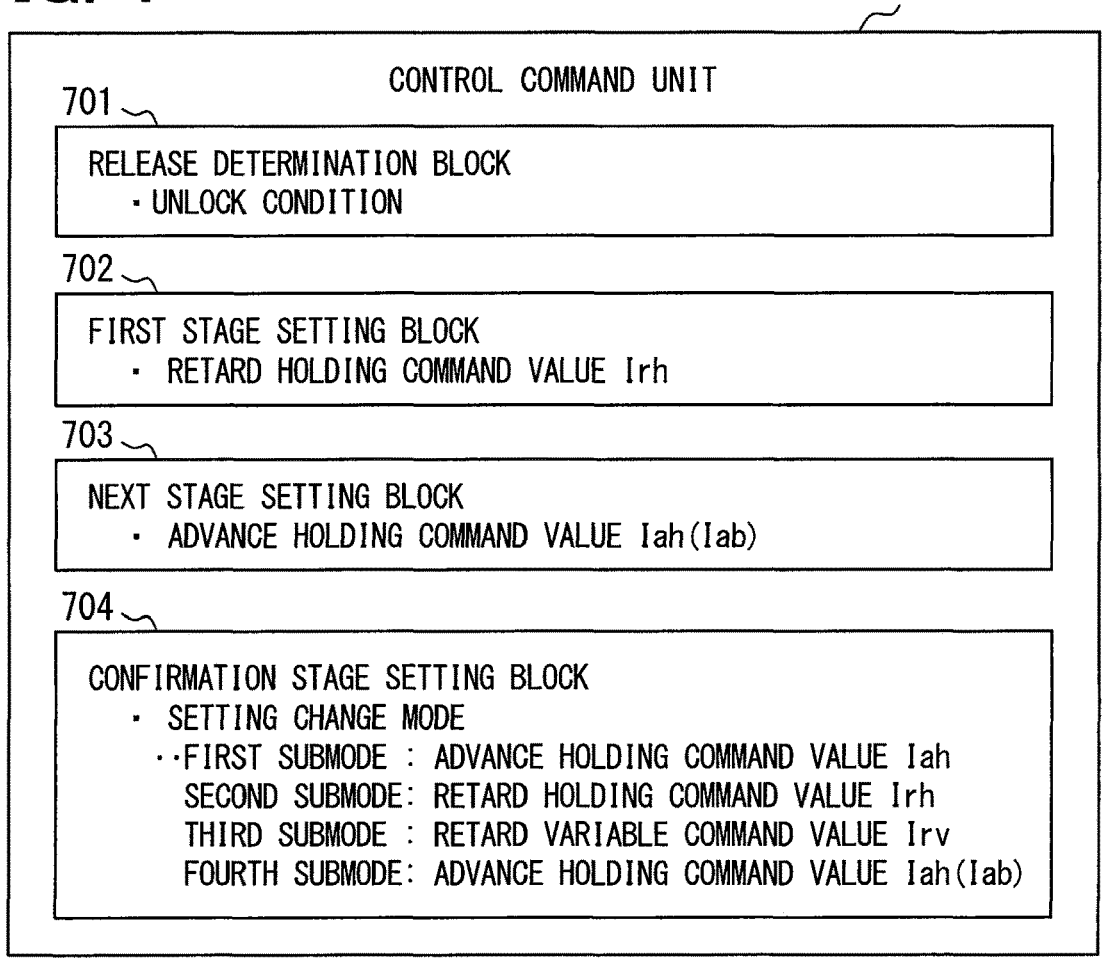
FIG. 4 is a block diagram illustrating plural blocks defined by the control command unit of the first embodiment.

The processor 71 of the control command unit 70 shown in FIG. 1 executes an unlock program memorized by the memory 72 to realize the unlock processing by functionally defining plural blocks 701, 702, 703, 704 shown in FIG. 4. At least a part of the blocks 701, 702, 703, 704 may be configured by hardware such as one or plural ICs. Moreover, the memory 72 which memorizes a control program for defining the blocks 701, 702, 703, 704 may be one or plural storage medium, such as semiconductor memory, magnetic media, or optical media.

The release determination block 701 functions under the state where the rotation phase is locked by setup of the advance variable command value Iav as the control command value I. The release determination block 701 determines whether the unlock condition of the rotation phase is satisfied (for example, in the period T0 of FIGS. 5 and 6). Namely, the release determination block 701 determines whether the unlock condition is satisfied under the state where the rotation phase is locked by setting the advance variable command value Iav in the advance variable domain Rav where hydraulic fluid is discharged from each retard operation chamber 22 and hydraulic fluid is introduced to each advance operation chamber 24.

Figure 5:
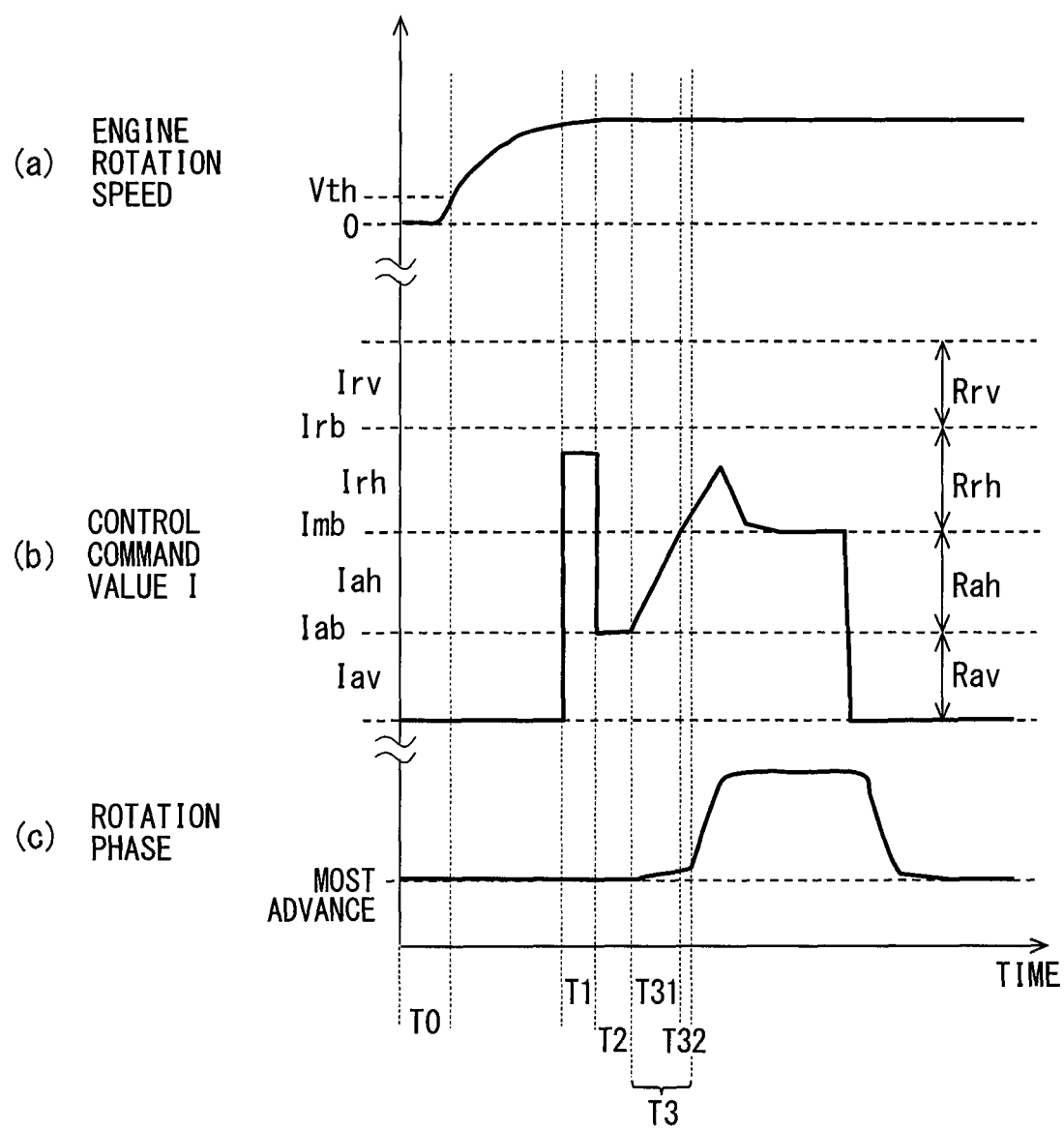
FIG. 5 is a time chart for explaining an unlock processing by the control command unit of the first embodiment.
Figure 6:
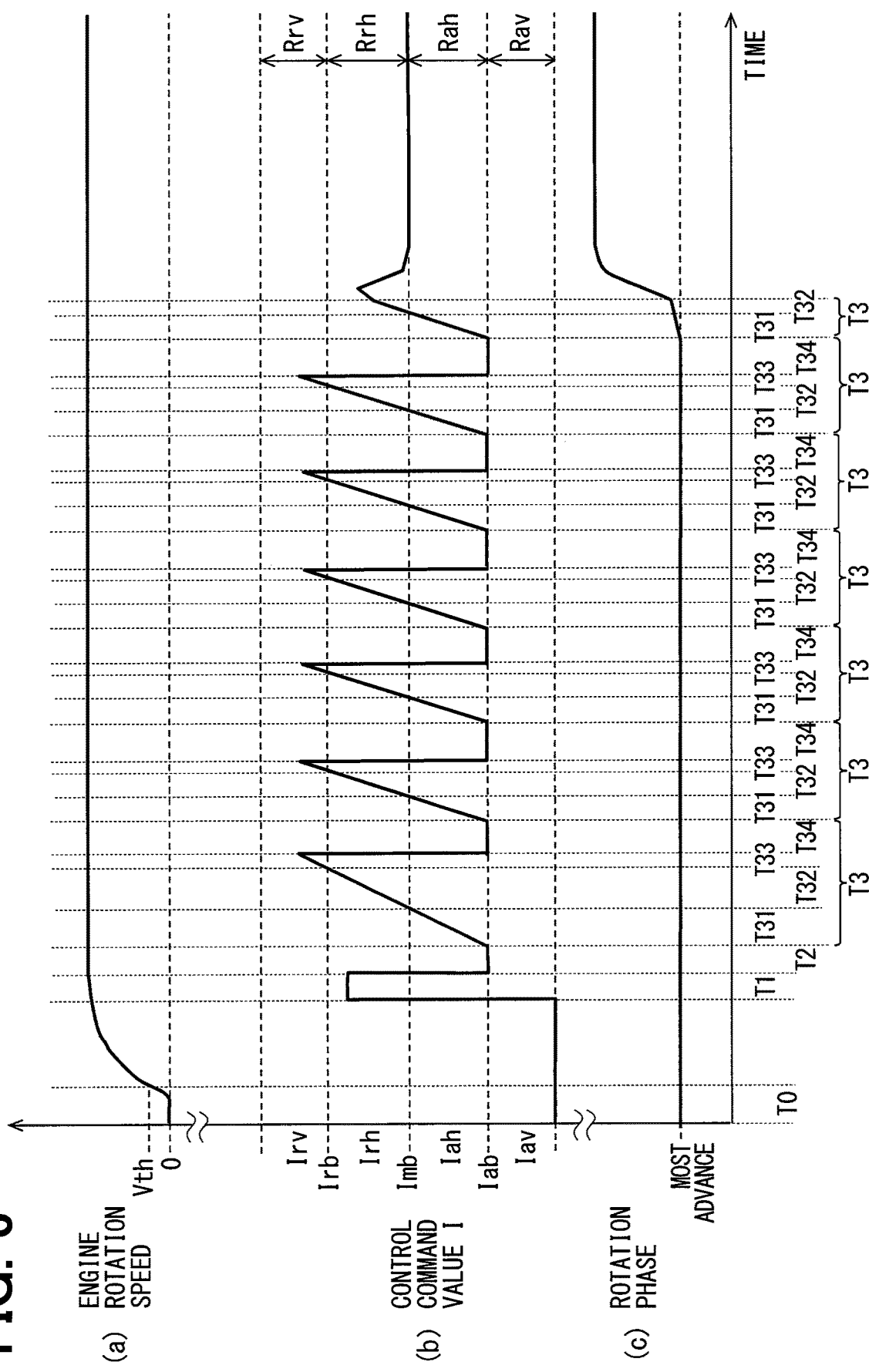
FIG. 6 is a time chart for explaining an unlock processing by the control command unit of the first embodiment.

When the unlock condition is not satisfied, the release determination block 701 continues setting the advance variable command value Iav. When the unlock condition is satisfied, the release determination block 701 hands over the unlock processing to the first stage setting block 702. Here, the unlock condition is satisfied when the engine revolving speed (such as, the number of rotations per unit time in the engine) exceeds a threshold value Vth by staring the internal-combustion engine, as shown in FIGS. 5 and 6, for example, by turning on the power switch of the vehicle or outputting a re-starting command for an idol stop system. In addition, the unlock condition may be satisfied, for example, at the time of starting the vehicle, the acceleration time or at the torque increasing time when the crank torque increases from a very low load state including no load condition.

The first stage setting block 702 shown in FIG. 4 functions after the unlock condition is satisfied. The first stage setting block 702 sets the retard holding command value Irh as the control command value I (for example, in the period T1 of FIGS. 5 and 6) such that the impression of the operation pressure more than or equal to the unlock pressure to the lock component 160 is started under the state where the rotation phase is locked by setup of the advance variable command value Iav. That is, the first stage setting block 702 introduces hydraulic fluid to each retard operation chamber 22 and regulates the flow in/out of hydraulic fluid to each advance operation chamber 24, by setting the retard holding command value Irh in the retard holding domain Rrh as a "first stage command value" holding the rotation phase.

At this time, the retard holding command value Irh is set to a fixed value that is close to a retard side boundary value Irb adjacent to the retard variable domain Rrv, as the control command value I in the retard holding domain Rrh. The flow rate of hydraulic fluid introduced to each retard operation chamber 22 increases as the communication area between the ports 63 and 65, shown in FIG. 3, approaches the retard side boundary value Irb. Thus, the time period taken for raising the operation pressure in the unlock chamber 164 to be more than or equal to the unlock pressure can be shortened. Then, the period T1 shown in FIGS. 5 and 6 during which the setup to the retard holding command value Irh continues is determined based on a notable physical quantity of the vehicle, in consideration of designed or experimental time until the operation pressure in the unlock chamber 164 becomes more than or equal to the unlock pressure. The notable physical quantity for setting the period T1 is defined by a physical quantity which influences the state of hydraulic fluid, e.g., at least one kind of physical quantities, for example, the engine cooling-water temperature, the engine lubricating-oil temperature, the engine revolving speed, and the supply pressure of the pump 4. In this way, when the setup of the retard holding command value Irh is completed, the unlock processing is received from the first stage setting block 702 to the next stage setting block 703.

The next stage setting block 703 shown in FIG. 4 functions after the setting of the retard holding command value Irh is completed by the first stage setting block 702. The next stage setting block 703 sets the advance holding command value Iah (for example, in the period T2 of FIGS. 5 and 6) as the control command value I to maintain the impression of operation pressure more than or equal to the unlock pressure to the lock component 160. That is, the next stage setting block 703 sets the advance holding command value Iah in the advance holding domain Rah as a "next stage command value" holding the rotation phase by introducing hydraulic fluid to each advance operation chamber 24 and regulating the flow in/out of hydraulic fluid to each retard operation chamber 22.

At this time, the advance holding command value Iah is set to a fixed value that is an advance side boundary value Iab adjacent to the advance variable domain Rav, as the control command value I in the advance holding domain Rah. The flow rate of the hydraulic fluid introduced to each advance operation chamber 24 increases as the communication area between the ports 64 and 65 shown in FIG. 3 approaches the advance side boundary value Iab. Therefore, it becomes possible to shorten the time period taken for securing the operation pressure in each advance operation chamber 24, which is required to restrict the rotation phase from changing before the unlocking. Then, the period T2 of FIGS. 5 and 6, during which the setup to the advance holding command value Iah continues, is determined based on the notable physical quantity of the vehicle in consideration of a designed or experimental time taken for securing such a required operation pressure in each advance operation chamber 24. In this way, when the setup of the advance holding command value Iah is completed, the unlock processing is received from the next stage setting block 703 to the confirmation stage setting block 704.

The confirmation stage setting block 704 shown in FIG. 4 functions after the completion of the setting of the advance holding command value Iah by the next stage setting block 703. The confirmation stage setting block 704 variably sets the control command value I, in order to confirm the unlock of rotation phase, in a range between the advance holding command value Iah and the retard variable command value Irv, (for example, in the period T3 of FIGS. 5 and 6). That is, the confirmation stage setting block 704 executes a setting change mode by which the control command value I is changed as a "confirmation command value". In this embodiment, as shown in FIGS. 5 and 6, the confirmation stage setting block 704 executes the setting change mode only once, or repeatedly plural times, until the unlocking is confirmed by change in the rotation phase. Here, four-step, i.e., the first to the fourth submodes are prepared relative to the setting change mode, for only once or each time.

First, the first submode (for example, in the period T31 of FIGS. 5 and 6) is indispensably executed in the setting change mode. In this first submode, the advance holding command value Iah is gradually changed in the advance holding domain Rah from the advance side boundary value Iab adjacent to the advance variable domain Rav toward the middle boundary value Imb adjacent to the retard holding domain Rrh. Thereby, in the first submode, the flow rate of hydraulic fluid introduced to each advance operation chamber 24 decreases gradually according to the decrease in the communication area between the ports 64 and 65 shown in FIG. 3 under the state where the flow in/out of hydraulic fluid to each retard operation chamber 22 is regulated. If the rotation phase is unlocked at this time, even while the flow in/out of the hydraulic fluid to each retard operation chamber 22 is regulated, the rotation phase slightly changes from the maximum advance phase in the retard direction with the cam torque transmitted to the vane rotor 14 from the camshaft 2 in the retard direction. Therefore, in the first submode, the unlocking can be confirmed based on whether the rotation phase is changed in the retard direction.

Next, the second submode is performed (for example, in the period T32 of FIGS. 5 and 6) when the unlocking is not confirmed in the first submode. In the second submode, the retard holding command value Irh is gradually changed in the retard holding domain Rrh from the middle boundary value Imb adjacent to the advance holding domain Rah toward the retard side boundary value Irb adjacent to the retard variable domain Rrv. Thereby, in the second submode, the flow rate of hydraulic fluid introduced to each retard operation chamber 22 increases gradually according to the increase in the communication area between the ports 63 and 65 shown in FIG. 3 under the state where the flow in/out of hydraulic fluid to each advance operation chamber 24 is regulated. If the rotation phase is unlocked at this time, even while the flow in/out of the hydraulic fluid to each advance operation chamber 24 is regulated, the rotation phase slightly changes from the maximum advance phase in the retard direction with the cam torque in the retard direction. Therefore, in the second submode, the unlocking can be confirmed based on whether the rotation phase is changed in the retard direction.

Then, the third submode is performed (for example, in the period T33 of FIG. 6) when the unlocking is not confirmed in the second submode. In the third submode, the retard holding command value Irh of the retard holding domain Rrh is gradually changed to the retard variable command value Irv of the retard variable domain Rrv until exceeding the retard side boundary value Irb. Thereby, in the third submode, the flow rate of hydraulic fluid discharged from each advance operation chamber 24 and the flow rate of hydraulic fluid introduced to each retard operation chamber 22 gradually increase according to the increase in the communication area between the ports 63 and 65 and between the ports 64 and 66, shown in FIG. 3. If the rotation phase is unlocked at this time, the rotation phase is easily changed from the maximum advance phase in the retard direction, due to the retard torque generated by introducing the hydraulic fluid to each retard operation chamber 22, and the cam torque in the retard direction. Therefore, in the third submode, the unlocking can be confirmed based on whether the rotation phase is changed in the retard direction.

Furthermore, the fourth submode is performed (for example, in the period T34 of FIG. 6) when the unlocking is not confirmed in the third submode. In the fourth submode, the advance holding command value Iah of the advance holding domain Rah is fixed at the advance side boundary value Iab, similarly to the next stage setting block 703. Thereby, in the fourth submode, the introduction of hydraulic fluid to each advance operation chamber 24 and the flow in/out regulation on each retard operation chamber 22 are maintained. If the rotation phase is unlocked at this time, even while the flow in/out of the hydraulic fluid to each retard operation chamber 22 is regulated, the rotation phase is slightly changed from the maximum advance phase in the retard direction with the cam torque in the retard direction. Therefore, in the fourth submode, the unlocking can be confirmed based on whether the rotation phase is changed in the retard direction. In case where the unlocking is not confirmed in the fourth submode, a next setting change mode is repeated. That is, the fourth submode is performed before the next setting change mode is repeated.

A change rate in the control command value I per time in the first to third submodes is set up based on the above-described notable physical quantity of the vehicle. Moreover, as the execution time of at least the first, second and fourth submodes, the continuation time of the gradual change or the setting continuation time of the control command value I is set based on the notable physical quantity of the vehicle, in consideration of a design or experimental time, by which the unlocking can be confirmed by change in the rotation phase while the lock component 160 is free from troubles between the rotors 12 and 14. Furthermore, when the unlocking is confirmed in one of the first to fourth submodes, the unlock processing is completed together with the setting change mode. FIG. 5 illustrates a case where the unlocking is confirmed by one setting change mode including the first and second submodes. FIG. 6 illustrates a case where the unlocking is confirmed by further once executing the setting change mode including the first and second submodes, after the setting change mode is executed plural times from the first to the fourth submodes.

According to the control command unit 70 which has the blocks 701, 702, 703, 704, as shown in FIGS. 7-10, the unlock control flow is carried out to the internal-combustion engine as the unlock processing. The details are explained below. The unlock control flow is started when the rotation phase is locked by setup of the advance variable command value Iav as the control command value I. In addition, "S" in the unlock control flow means each step.

Figure 7:
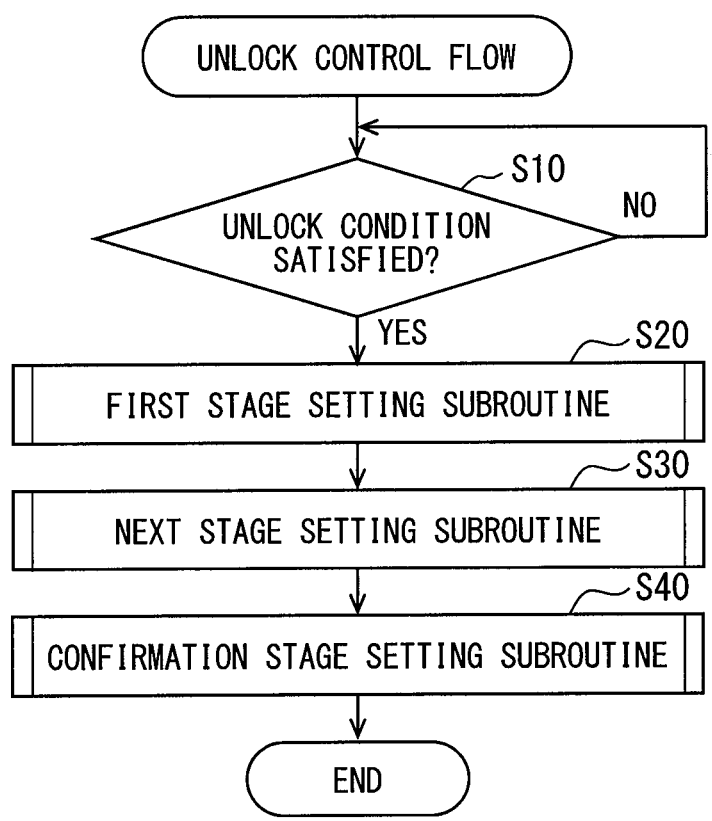
FIG. 7 is a flow chart illustrating an unlock flow carried out by the control command unit of the first embodiment.

As shown in FIG. 7, it is determined whether the unlock condition is satisfied by the release determination block 701 in S10. S10 is repeatedly performed until the unlock condition is satisfied. When the unlock condition is satisfied, the unlock control flow shifts to S20.

Figure 8:
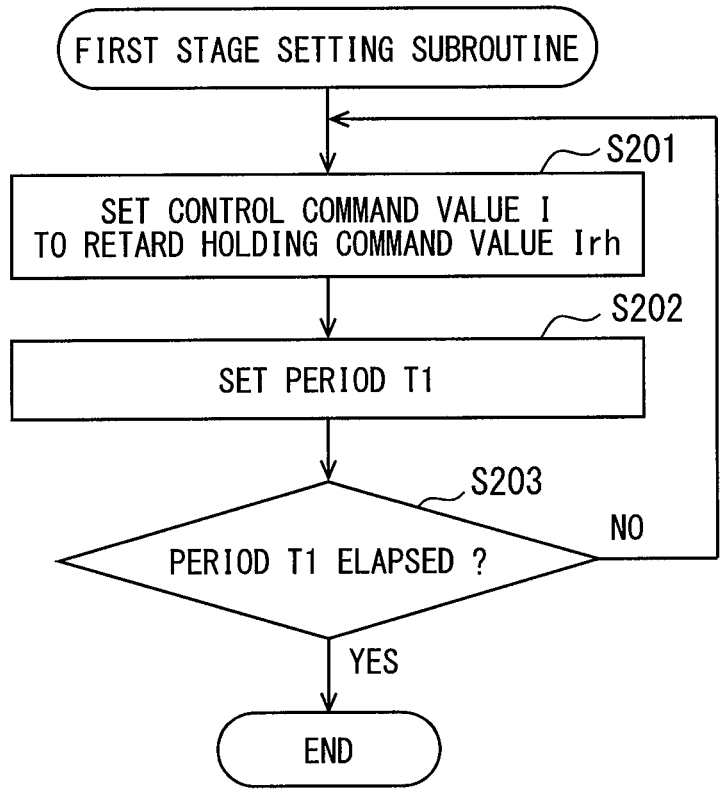
FIG. 8 is a flow chart illustrating a first stage setting subroutine of FIG. 7.

In S20, the first stage setting subroutine is performed by the first stage setting block 702. As shown in FIG. 8, in S201 of the first stage setting subroutine, the control command value I is set as the retard holding command value Irh. Next, in S202, the period T1 is set, during which the setup to the retard holding command value Irh continues. Then, in S203, it is determined whether the lapsed time reaches the setting period T1 of S202, from firstly performing S201 after the start of the first stage setting subroutine. When the lapsed time has not reached the setting period T1, the subroutine returns to S201. When the lapsed time reaches the setting period T1, the first stage setting subroutine is completed and the control flow shifts to S30 shown in FIG. 7. The unlock control flow can be compulsorily terminated in S20, when the rotation phase changes, even executing one of S201-S203.

Figure 9:
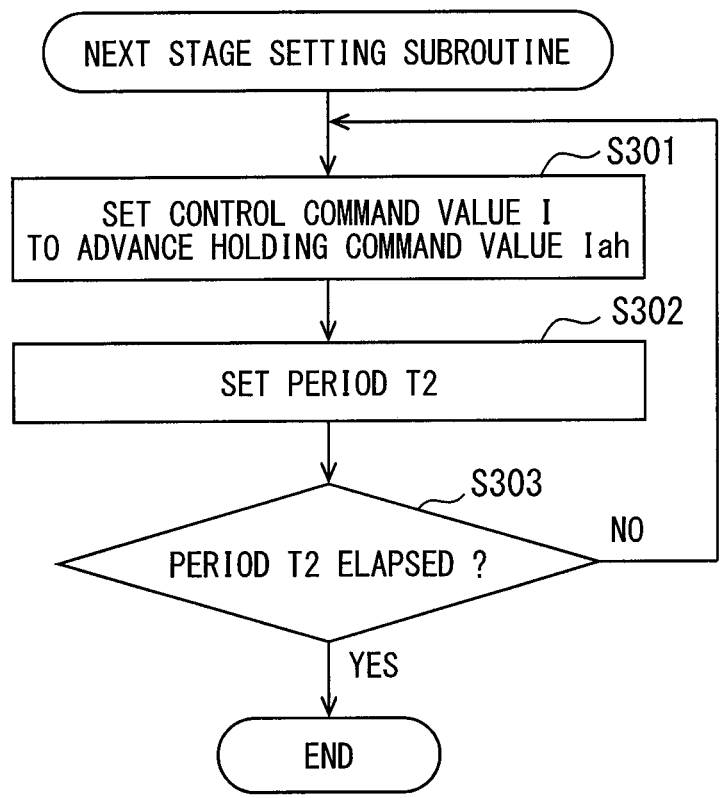
FIG. 9 is a flow chart illustrating a next stage setting subroutine of FIG. 7.

In S30, the next stage setting subroutine is performed by the next stage setting block 703. As shown in FIG. 9, in S301 of the next stage setting subroutine, the control command value I is set as the advance holding command value Iah. Next, in S302, the period T2 during which the setup to the advance holding command value Iah continues is set up. Then, in S303, it is determined whether the lapsed time reaches the setting period T2 of S302, from firstly performing S301 after the start of the next stage setting subroutine. When the lapsed time has not reached the setting period T2, the subroutine returns to S301. When the lapsed time reaches the setting period T2, the next stage setting subroutine is completed and the control flow shifts to S40 shown in FIG. 7. The unlock control flow can be compulsorily terminated in S30, when the rotation phase changes, even executing one of S301-S303.

Figure 10:
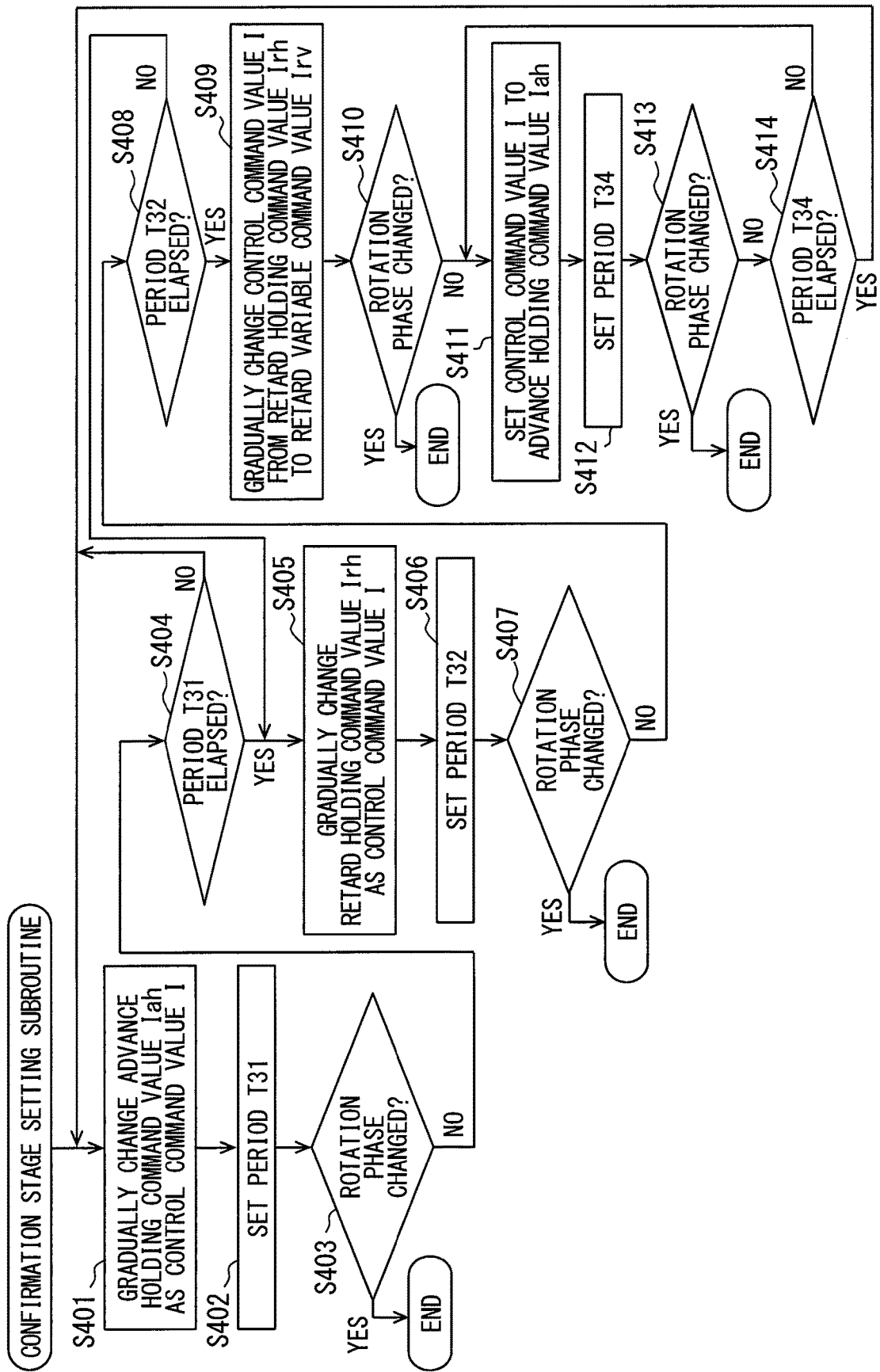
FIG. 10 is a flow chart illustrating a confirmation stage setting subroutine of FIG. 7.

In S40, the confirmation stage setting subroutine is performed by the confirmation stage setting block 704. As shown in FIG. 10, in S401 of the confirmation stage setting subroutine, the advance holding command value Iah is gradually changed as the control command value I by the first submode of the setting change mode. Next, in S402, the period T31 is set up, during which the gradual change of the advance holding command value Iah continues. Then, in S403, it is determined whether the rotation phase is changed based on the rotation angle of the crankshaft and the rotation angle of the camshaft 2. When it is determined that the rotation phase is not changed, the subroutine shifts to S404. In S404, it is determined whether the lapsed time reaches the setting period T31 of S403, from firstly performing S401 after the start of the confirmation setting subroutine. When the lapsed time has not reached the setting period T31, the subroutine returns to S401. When the lapsed time reaches the setting period T31, the subroutine shifts to S405.

In S405, the retard holding command value Irh is gradually changed as the control command value I by the second submode of the setting change mode. Next, in S406, the period T32 is set up, during which the gradual change of the retard holding command value Irh continues. Then, in S407, it is determined whether the rotation phase is changed based on the rotation angle of the crankshaft and the rotation angle of the camshaft 2. When it is determined that the rotation phase is not changed, the subroutine shifts to S408. In S408, it is determined whether the lapsed time reaches the setting period T32 of S406, from firstly performing S405 after the start of the confirmation setting subroutine. When the lapsed time has not reached the setting period T32, the subroutine returns to S405. When the lapsed time reaches the setting period T32, the subroutine shifts to S409.

In S409, the control command value I is gradually changed from the retard holding command value Irh to the retard variable command value Irv by the third submode of the setting change mode. When the control command value I exceeds the retard side boundary value Irb, in S410, it is determined whether the rotation phase is changed based on the rotation angle of the crankshaft and the rotation angle of the camshaft 2. When it is determined that the rotation phase is not changed, the subroutine shifts to S411.

In S411, the control command value I is set as the advance holding command value Iah by the third submode of the setting change mode. Next, in S412, the period T34 is set up, during which the setup to the advance holding command value Iah continues. Then, in S413, it is determined whether the rotation phase is changed based on the rotation angle of the crankshaft and the rotation angle of the camshaft 2. When it is determined that the rotation phase is not changed, the subroutine shifts to S414. In S414, it is determined whether the lapsed time reaches the setting period T34 of S412, from firstly performing S411 after the start of the confirmation setting subroutine. When the lapsed time has not reached the setting period T34, the subroutine returns to S411. When the lapsed time reaches the setting period T34, the setting change mode is repeated by returning to S401.

When it is determined that the rotation phase is changed by S403, S407, S410, or S413, the confirmation stage setting subroutine is completed, and the unlock control flow is ended, as shown in FIG. 7.

Action and Effect

The action and effect of the first embodiment is explained below.

According to the first embodiment, under the lock state of the rotation phase, the first stage setting block 702 sets the retard holding command value Irh to introduce hydraulic fluid to each retard operation chamber 22, so as to start applying the operation pressure more than or equal to the unlock pressure to the lock component 160. Therefore, even in case where the operation pressure which acts on the lock component 160 does not easily increase or even when the sliding resistance of the lock component 160 is large, the delay in motion of the lock component 160 can be controlled, since the operation pressure can be heightened as much as possible in the unlock chamber 164 into which hydraulic fluid is introduced through each retard operation chamber 22.

After the first stage setting block 702 sets the retard holding command value Irh, the next stage setting block 703 sets the advance holding command value Iah to introduce hydraulic fluid to each advance operation chamber 24, so as to maintain the applying of the operation pressure more than or equal to the unlock pressure to the lock component 160. Thereby, under the state where the function of controlling the delay in motion of the lock component 160 is maintained, a torque can be generated by hydraulic fluid introduced to each advance operation chamber 24 based on the advance holding command value Iah in a direction opposite from the torque for changing the rotation phase by the hydraulic fluid introduced to each retard operation chamber 22 based on the retard holding command value Irh. Therefore, while the rotation phase is restricted from changing before the unlocking, the unlocking can be quickly realized by the lock component 160. Therefore, it becomes possible to avoid a trouble in the lock component as a fault operation caused by the unlocking.

According to the first embodiment, the first stage setting block 702 sets the retard holding command value Irh under the state where the rotation phase is locked by discharging hydraulic fluid from each retard operation chamber 22 and by introducing hydraulic fluid to each advance operation chamber 24. Thereby, after the setup of the retard holding command value Irh, the introduction of hydraulic fluid is added to each advance operation chamber 24, where hydraulic fluid was introduced in the lock state, based on the advance holding command value Iah. Thus, the rotation phase can be quickly restricted from changing before the unlocking. Therefore, it becomes possible to raise the reliability of the effect of avoiding trouble of the lock component 160 caused by the unlocking.

Moreover, according to the first embodiment, the first stage setting block 702 sets the retard holding command value Irh as the control command value I holding the rotation phase, by introducing hydraulic fluid to each retard operation chamber 22 and regulating the flow in/out of hydraulic fluid to each advance operation chamber 24. Therefore, the hydraulic fluid can be introduced based on the advance holding command value Iah into each advance operation chamber 24 into which hydraulic fluid is introduced in the lock state, after regulating the flow in/out of the hydraulic fluid based on the retard holding command value Irh. Therefore, it is possible to quickly raise the function for restricting the rotation phase from changing before the unlocking. Thus, it is possible to guarantee the reliability of the effect of avoiding trouble of the lock component 160 caused by the unlocking.

Furthermore, according to the first embodiment, the next stage setting block 703 sets the advance holding command value Iah as the control command value I for holding the rotation phase by regulating the flow in/out of hydraulic fluid to each retard operation chamber 22 and by introducing the hydraulic fluid to each advance operation chamber 24. Therefore, the operation pressure impressed to the lock component 160 in response to the introduction of hydraulic fluid to each retard operation chamber 22 based on the retard holding command value Irh can be easily maintained to be more than or equal to the unlock pressure, due to the regulation of flow in/out of hydraulic fluid to each retard operation chamber 22 based on the advance holding command value Iah. Since the function of restricting the delay in motion of the lock component 160 can be certainly kept, it is possible to improve the reliability of the effect of avoiding trouble of the lock component 160 caused by the unlocking.

Furthermore, according to the first embodiment, the next stage setting block 703 sets the advance holding command value Iah as the control command value I, in the advance holding domain Rah, for holding the rotation phase, by regulating the flow in/out of hydraulic fluid to each retard operation chamber 22 and by introducing hydraulic fluid to each advance operation chamber 24. The advance holding command value Iah is set as the advance side boundary value Iab adjacent to the advance variable domain Rav for changing the rotation phase by introducing hydraulic fluid to each advance operation chamber 24 and by discharging hydraulic fluid from each retard operation chamber 22, as the control command value I in the advance holding domain Rah. Accordingly, the flow in/out of hydraulic fluid to each retard operation chamber 22 based on the advance holding command value Iah can be correctly regulated using the advance side boundary value Iab which depends on the mechanical structure of the control valve 60. Therefore, it is possible to control the delay in motion of the lock component 160 caused by the hydraulic fluid discharged from each retard operation chamber 22. Thus, the reliability can be secured for the effect of avoiding trouble of the lock component 160 caused by the unlocking.

In addition, after the next stage setting block 703 sets the advance holding command value Iah, the confirmation stage setting block 704 sets the retard holding command value Irh and the retard variable command value Irv to introduce hydraulic fluid to each retard operation chamber 22 in order to confirm the unlocking. Thereby, it can confirm whether the rotation phase is unlocked by the introduction of hydraulic fluid to each advance operation chamber 24 due to the advance holding command value Iah, based on whether the rotation phase is changed in response to the introduction of hydraulic fluid to each retard operation chamber 22 due to the retard holding command value Irh or the retard variable command value Irv. Therefore, it becomes possible to avoid trouble of the lock component 160 that is caused by excessive change in the rotation phase for confirming the unlocking.

According to the first embodiment, the confirmation stage setting block 704 sets and changes the retard holding command value Irh and the retard variable command value Irv by executing the setting change mode to gradually increase the flow rate of hydraulic fluid introduced to each retard operation chamber 22. Even when the rotation phase is not unlocked, the introduction of hydraulic fluid according to the retard holding command value Irh or the retard variable command value Irv can restrict the excessive change in the rotation phase that is caused by abrupt increase in the operation pressure in each retard operation chamber 22. Therefore, it becomes possible to raise the reliability of the effect of avoiding trouble of the lock component 160 caused by the confirmation of the unlocking.

Furthermore, according to the first embodiment, the confirmation stage setting block 704 repeats the setting change mode in which the retard holding command value Irh or the retard variable command value Irv is changed, until the unlocking is confirmed. Thereby, the confirmation of the unlocking can be repeatedly performed, while the change range of the operation pressure in each retard operation chamber 22 caused by introducing the hydraulic fluid in response to the change in the retard holding command value Irh or the retard variable command value Irv can be limited to a range suitable for avoiding the trouble of the lock component 160. Therefore, it becomes possible to guarantee the reliability of the effect of avoiding trouble of the lock component 160 caused by the confirmation of the unlocking.

Furthermore, according to the confirmation stage setting block 704 of the first embodiment, the advance holding command value Iah is set prior to the repeating of the next setting change mode. Since the flow in/out of hydraulic fluid to each retard operation chamber 22 is regulated and the hydraulic fluid is introduced to each advance operation chamber 24, the change in the rotation phase can be restricted before becoming excessive, even while the flow rate of hydraulic fluid introduced to each retard operation chamber 22 is increased gradually in the last setting change mode. Therefore, it becomes possible to guarantee, with high reliability, the effect of avoiding trouble of the lock component 160 caused by the confirmation of the unlocking.

Second Embodiment

Figure 11:
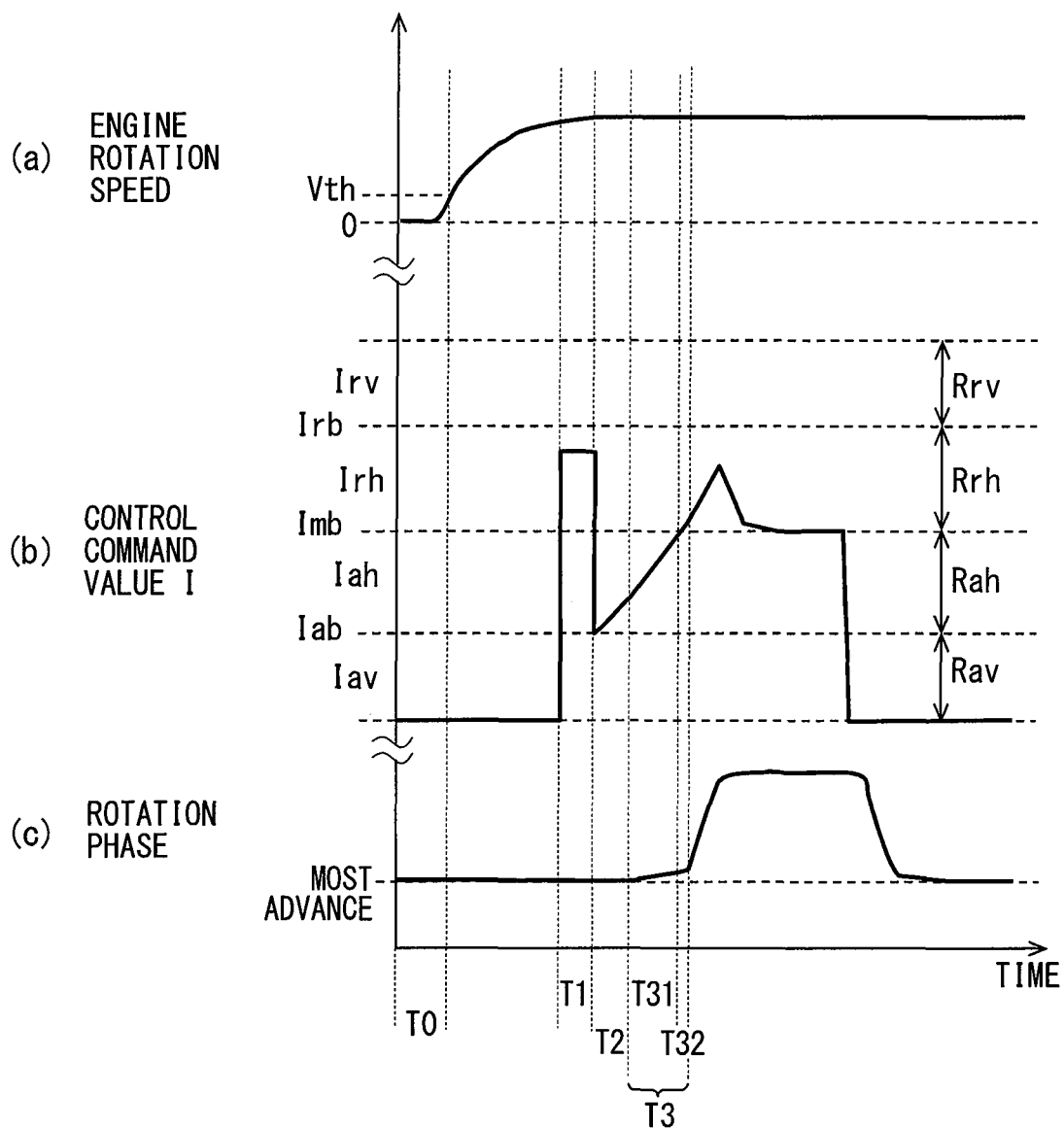
FIG. 11 is a time chart for explaining an unlock processing by a control command unit according to a second embodiment.

As shown in FIG. 11, the second embodiment of the present disclosure is a modification of the first embodiment. In the second embodiment, the next stage setting block 703 sets the advance holding command value Iah that is a variable value changing with time in the advance holding domain Rah. The advance holding command value Iah is set at first as the advance side boundary value Iab adjacent to the advance variable domain Rav in the advance holding domain Rah, and is gradually changed to separate away from the advance variable domain Rav in the domain Rah. The change rate of the advance holding command value Iah per time is set based on the notable physical quantity of the vehicle as explained in the first embodiment.

According to the second embodiment, the next stage setting block 703 sets the advance holding command value Iah as the advance side boundary value Iab adjacent to the advance variable domain Rav in the advance holding domain Rah, and then, the advance holding command value Iah is gradually changed to the opposite side away from the advance variable domain Ray. Thereby, even if a manufacturing error is generated in the advance side boundary value Iab based on the mechanical structure of the control valve 60, the discharge of hydraulic fluid from each retard operation chamber 22 can be made the minimum, since the advance holding command value Iah is gradually changed to the side opposite from the advance variable domain Ray. Therefore, the function of controlling the delay in motion of the lock component 160 can certainly be restricted from being inhibited by the operation pressure applied to the lock component 160 being less than the unlock pressure. Therefore, it becomes possible to guarantee, with high reliability, the effect of avoiding trouble of the lock component 160 caused by the unlocking.

Other Embodiment

As mentioned above, although the plural embodiments of the present disclosure are described, the present disclosure is not limited to the embodiments, and can be applied to various embodiments and their combinations within a range not deviated from the scope of the present disclosure. Modifications common to the first and second embodiments are explained below, and FIGS. 12-21 illustrate only the modifications about the first embodiment.

Figure 12:
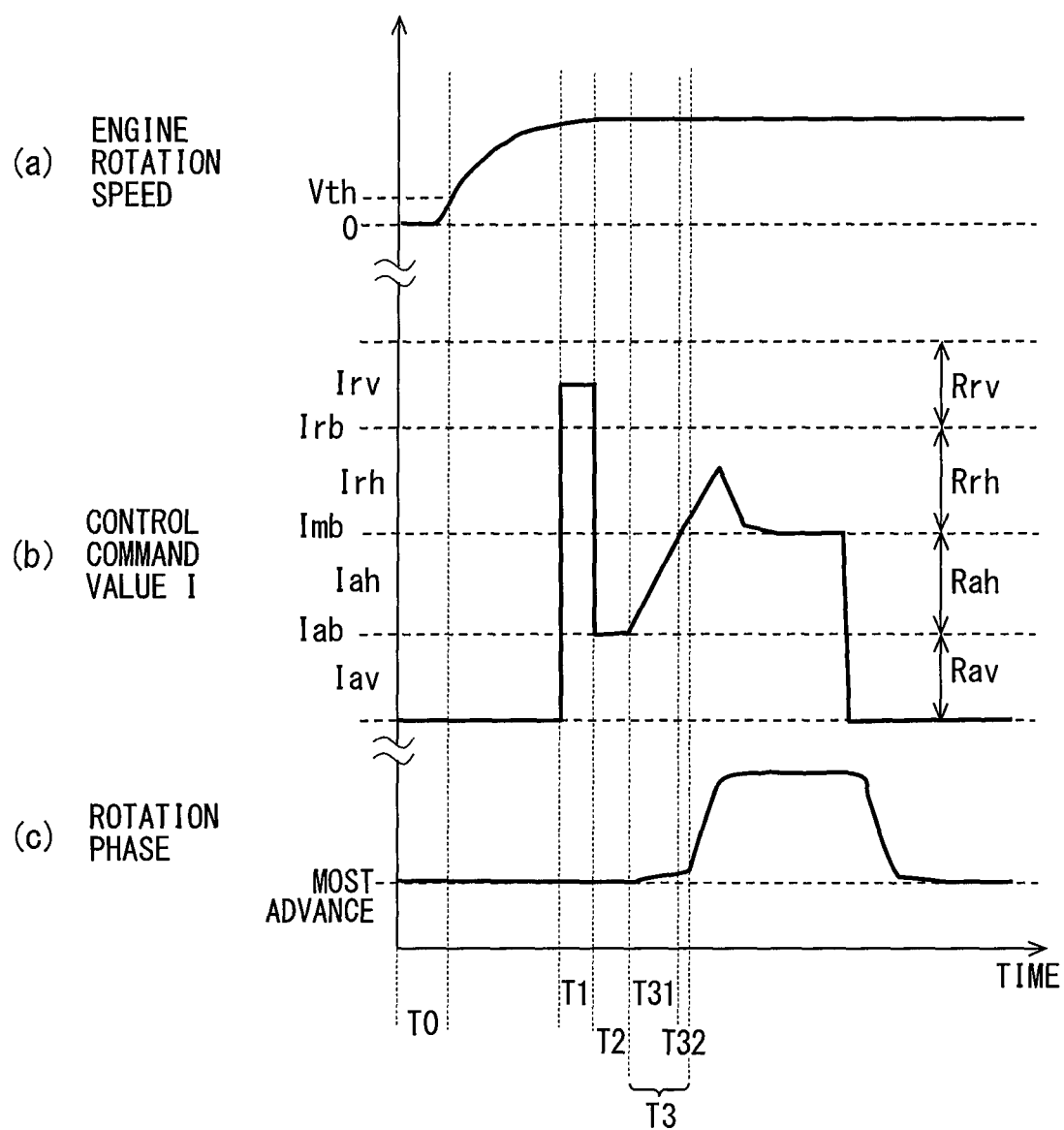
FIG. 12 is a time chart for explaining an unlock processing as a modification of FIG. 5.
Figure 13:
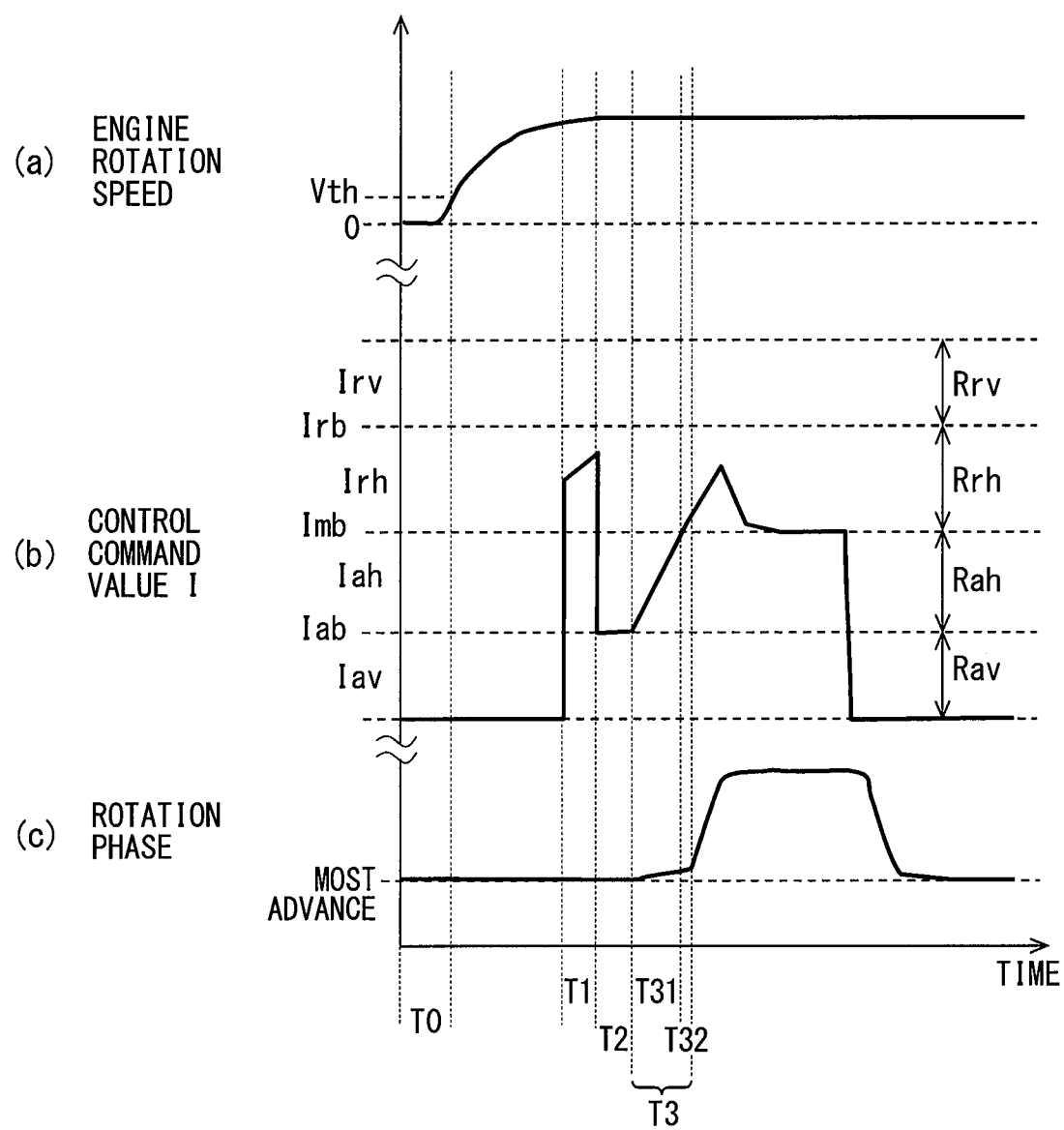
FIG. 13 is a time chart for explaining an unlock processing as a modification of FIG. 5.

As shown in FIG. 12, the first stage setting block 702 according to a first modification sets the retard variable command value Irv of the retard variable domain Rrv for changing the rotation phase by introducing the hydraulic fluid to each retard operation chamber 22 and by discharging hydraulic fluid from each advance operation chamber 24. As shown in FIG. 13, the first stage setting block 702 according to a second modification may set the retard holding command value Irh as a variable value which changes with time in the retard holding domain Rrh. The first stage setting block 702 of the second modification may gradually change the retard holding command value Irh, as shown in FIG. 13, to approach, for example the retard variable domain Rrv in the retard holding domain Rrh. Moreover, the first stage setting block 702 of the second modification sets the change rate of the retard holding command value Irh per time based on the notable physical quantity of the vehicle as explained in the first embodiment.

Figure 14:
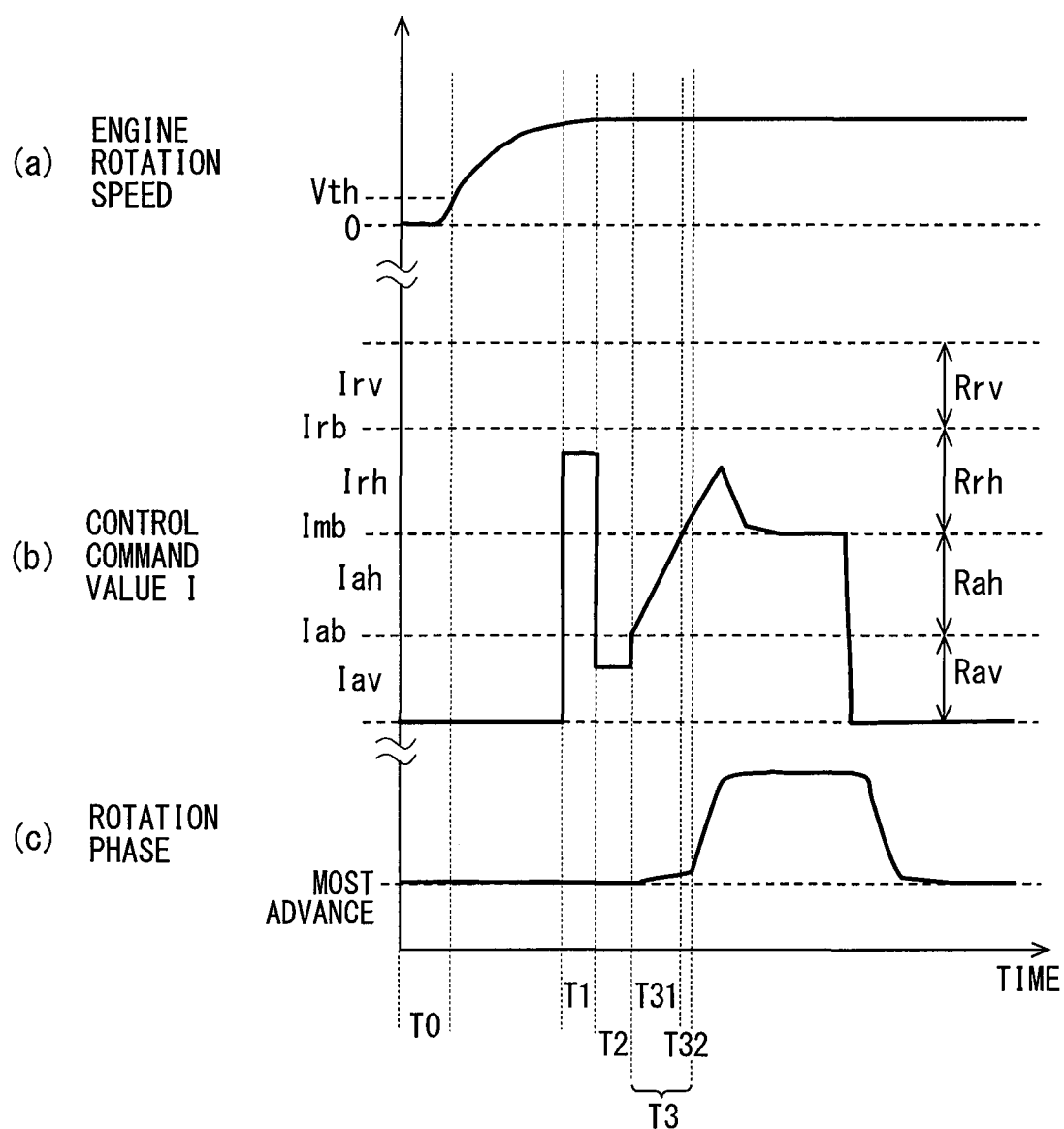
FIG. 14 is a time chart for explaining an unlock processing as a modification of FIG. 5.
Figure 15:
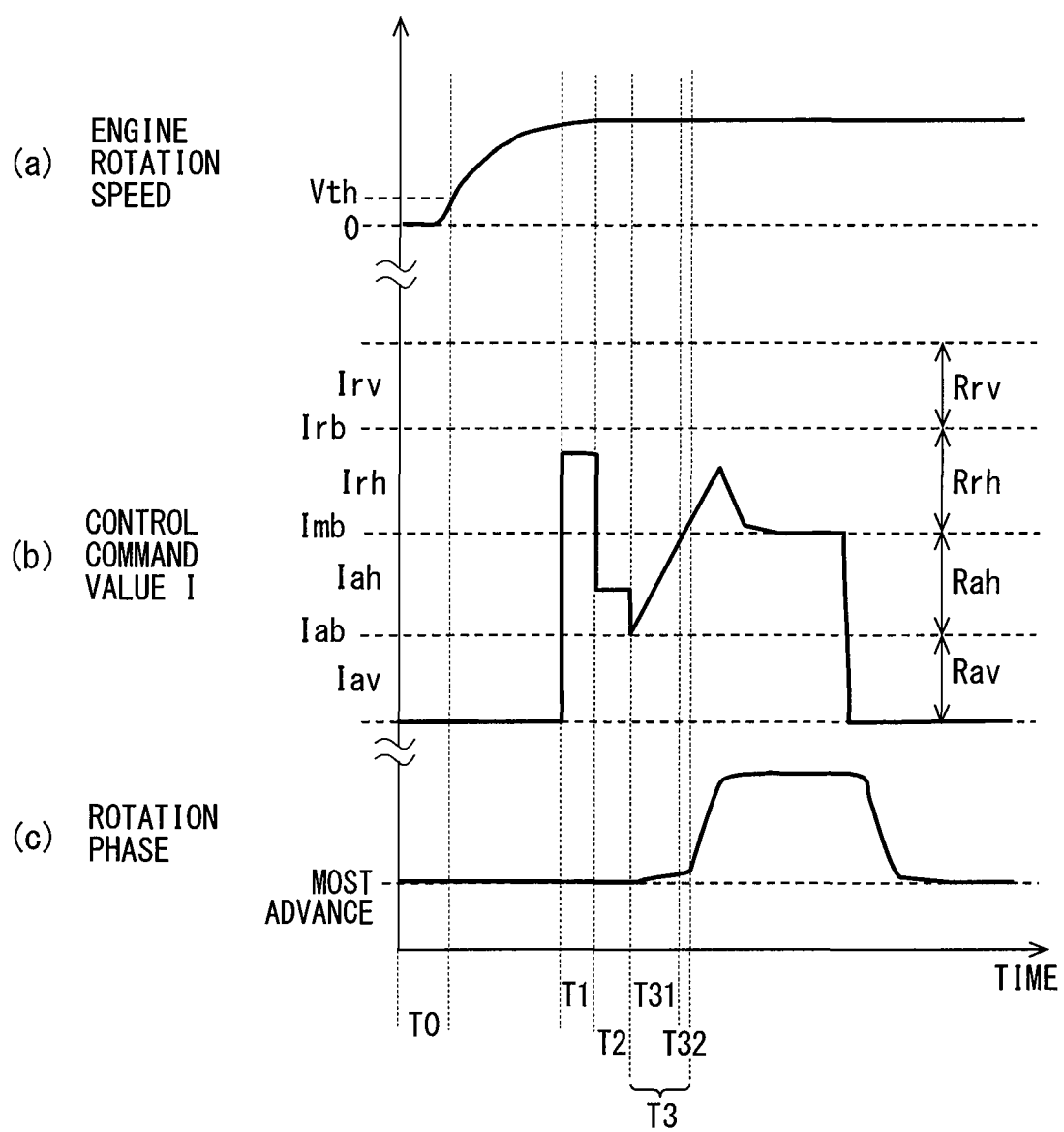
FIG. 15 is a time chart for explaining an unlock processing as a modification of FIG. 5.

As shown in FIG. 14, the next stage setting block 703 according to a third modification may set the advance variable command value Iav of the advance variable domain Ray for changing the rotation phase by introducing hydraulic fluid to each advance operation chamber 24 and by discharging hydraulic fluid from each retard operation chamber 22. As shown in FIG. 15, the next stage setting block 703 according to a fourth modification sets the advance holding command value Iah that is away from the advance side boundary value Iab to the side opposite from the advance variable domain Ray, in the advance holding domain Rah.

Figure 16:
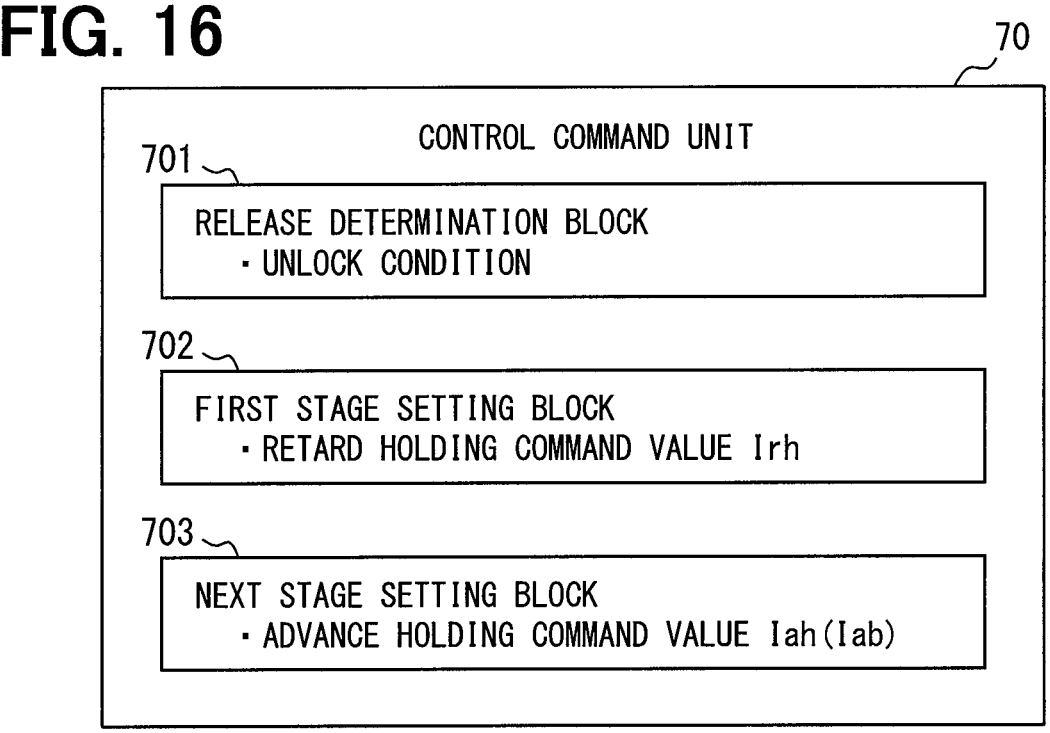
FIG. 16 is a block diagram illustrating plural blocks as a modification of FIG. 4.
Figure 17:
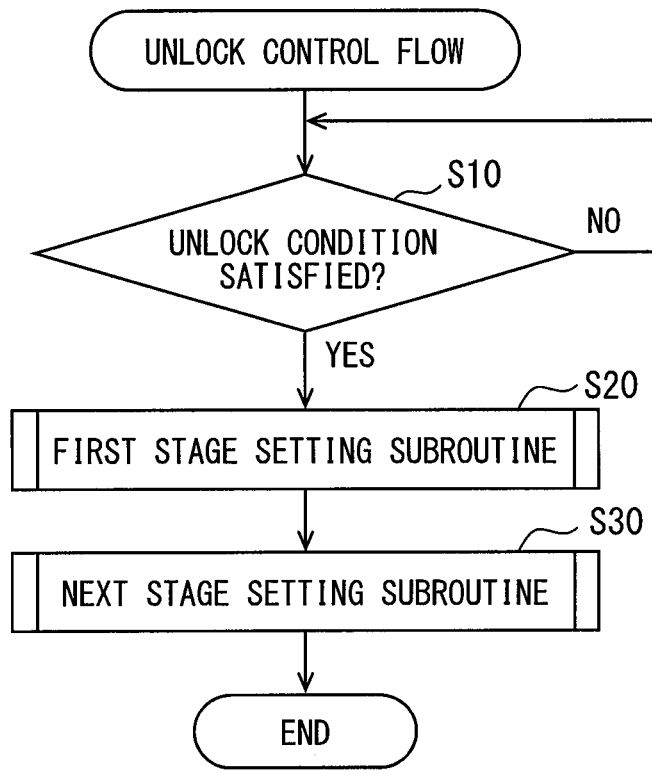
FIG. 17 is a flow chart illustrating an unlock flow as a modification of FIG. 7.
Figure 18:
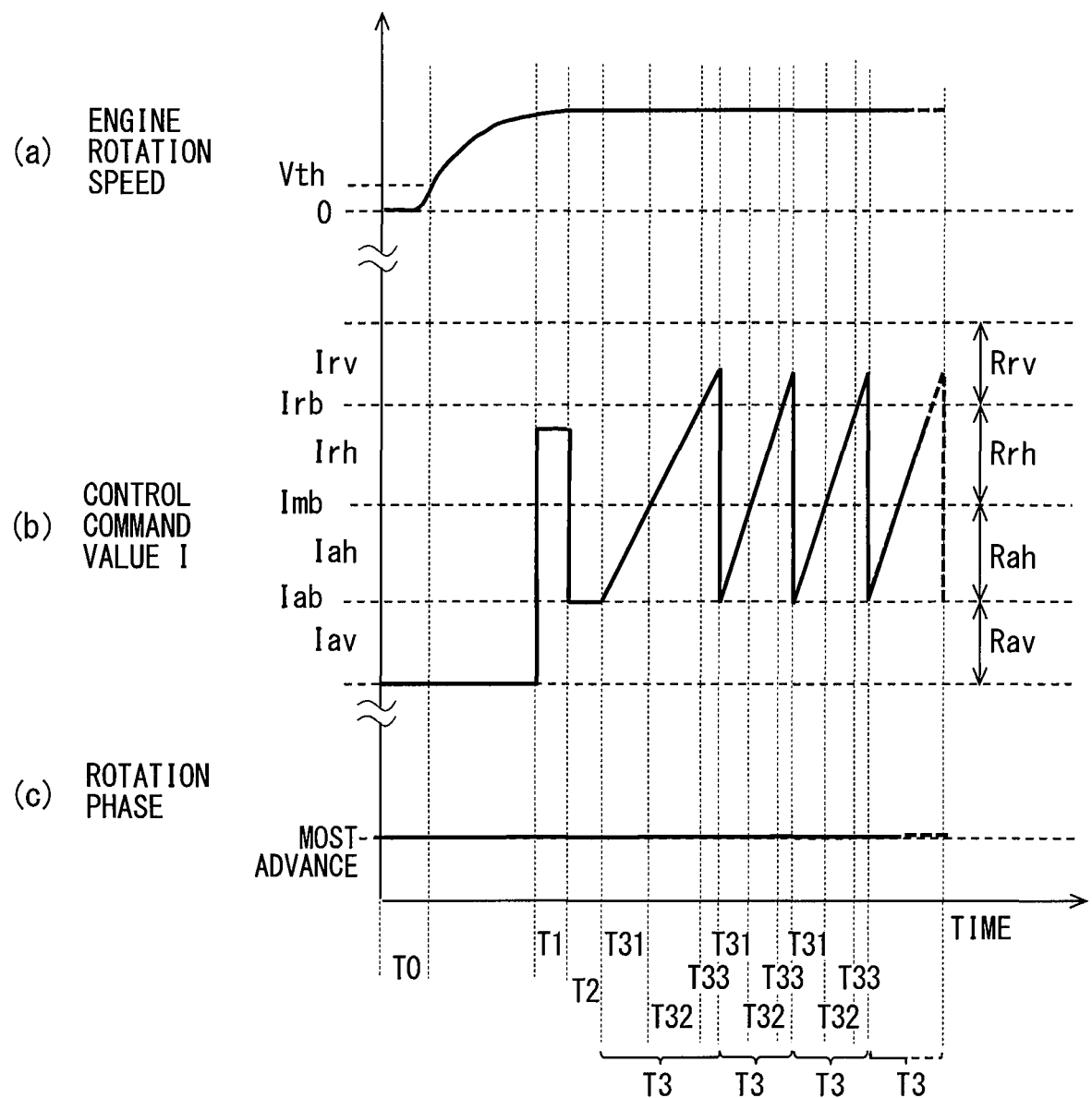
FIG. 18 is a time chart for explaining an unlock processing as a modification of FIG. 6.

According to a fifth modification, as shown in FIG. 16, the confirmation stage setting block 704 may be eliminated. As shown in FIG. 17, the confirmation stage setting subroutine may be omitted. In the confirmation stage setting block 704 according to a sixth modification, as shown in FIG. 18, the fourth mode may be omitted, without the period T34.

Figure 19:
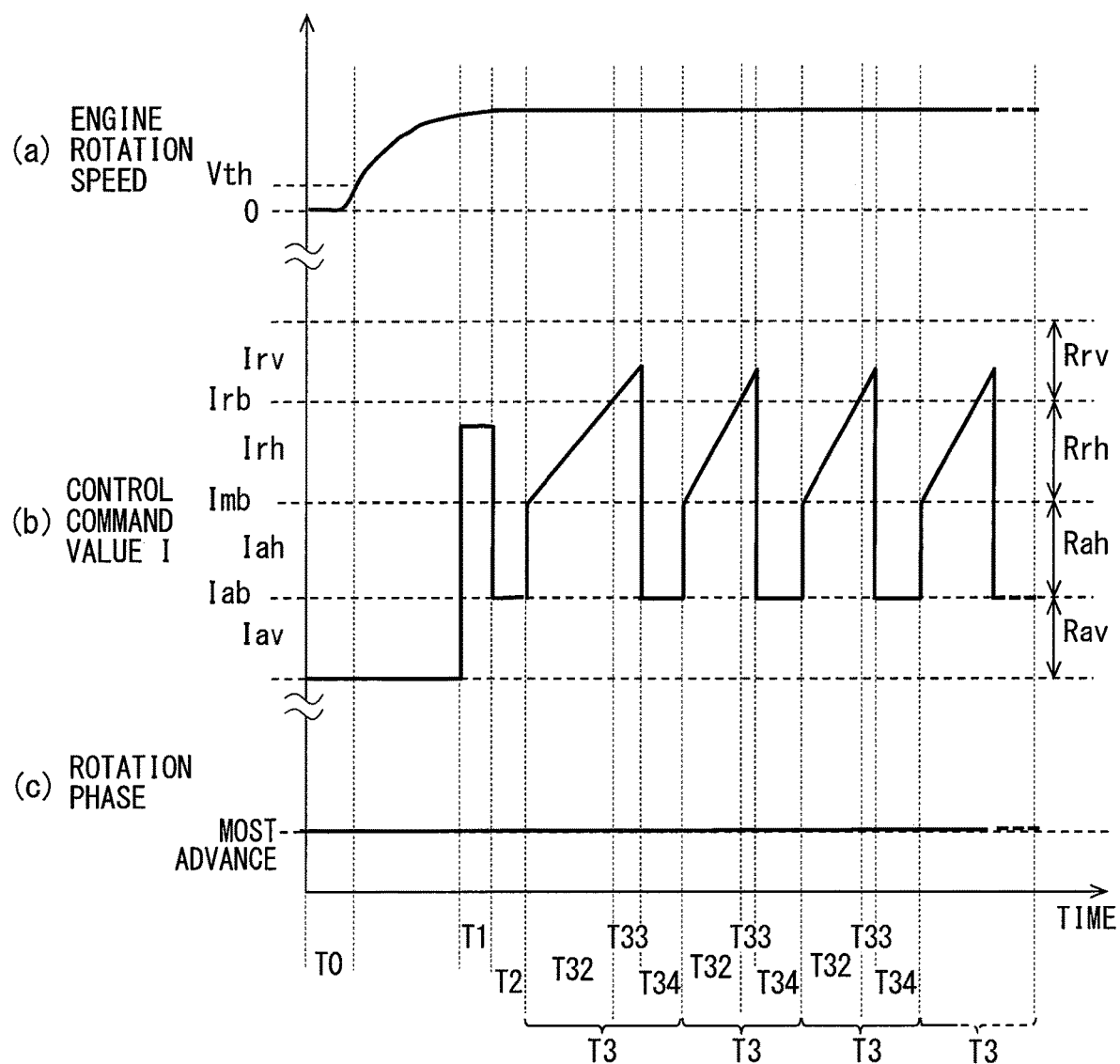
FIG. 19 is a time chart for explaining an unlock processing as a modification of FIG. 6.

In the confirmation stage setting block 704 according to a seventh modification, as shown in FIG. 19, at least one of the first submode and the second submode is omitted, namely, at least one of the period T31 and the period T32 is omitted. FIG. 19 illustrates a case where only the first submode is omitted among the first submode having period T31 and the second submode having the period T32.

Figure 20:
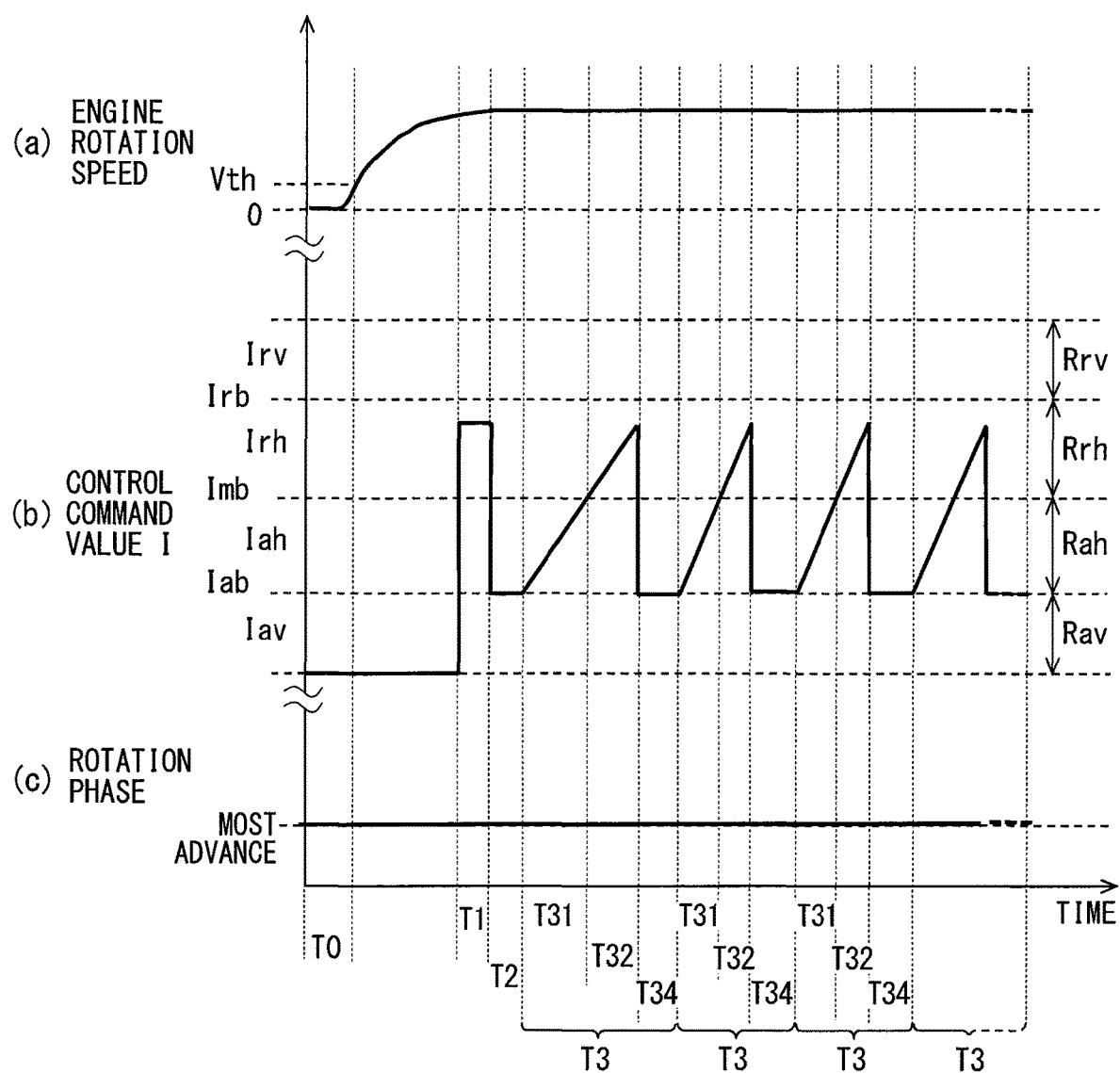
FIG. 20 is a time chart for explaining an unlock processing as a modification of FIG. 6.
Figure 21:
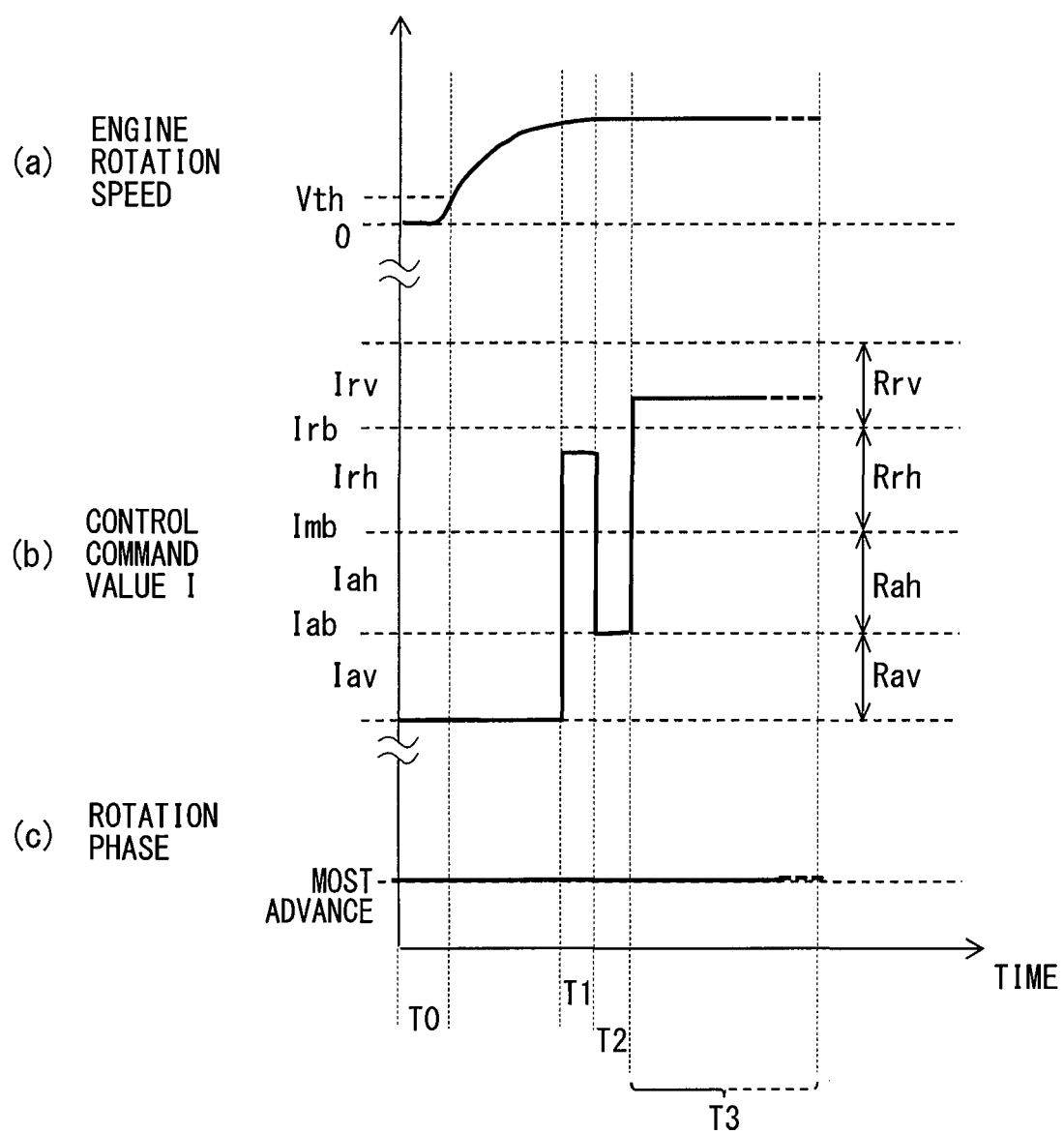
FIG. 21 is a time chart for explaining an unlock processing as a modification of FIG. 6.

As shown in FIG. 20, according to an eighth modification, in the confirmation stage setting block 704, the third submode within the period T33 may be omitted, when the control command value I changes gradually to the predetermined retard holding command value Irh in the second submode within the period T32. In the confirmation stage setting block 704 according to a ninth modification, as shown in FIG. 21, instead of the setting change mode, the control command value I may be set as one or plural values in the range from the advance holding command value Iah to the retard variable command value Irv. The predetermined retard variable command value Irv is set within the period T3, according to the ninth modification shown in FIG. 21.

In a tenth modification, the rotation phase may be locked at a middle phase by introducing hydraulic fluid to each advance operation chamber 24 and by regulating the flow in/out of hydraulic fluid to each retard operation chamber 22 by setup of the advance holding command value Iah as the control command value I. In an eleventh modification, the relation between "advance" and "retard" may be exchanged in each of the embodiments. In this case, each advance operation chamber 24 functions as the "first operation chamber", and each retard operation chamber 22 functions as the "second operation chamber."

In a twelfth modification, an electric pump may be used as the pump 4 of the internal-combustion engine. In a thirteenth modification, the present disclosure may be applied to a system which variably controls valve timing of an intake valve as "valve", or a system which variably controls valve timing of both of an intake valve and an exhaust valve as "valve."

The invention claimed is:

1. A valve timing control system that variably controls valve timing of a valve opened and closed by a camshaft by a transfer of a crank torque from a crankshaft in an internal-combustion engine, in response to a rotation phase of the camshaft to the crankshaft, the valve timing control system comprising:

a phase adjustment unit including a first operation chamber and a second operation chamber between rotors respectively rotating with the crankshaft and the camshaft, the phase adjustment unit adjusting the rotation phase by a flow in/out of hydraulic fluid to the first operation chamber and the second operation chamber, a generating direction of a torque for changing the rotation phase in response to introduction of hydraulic fluid being opposite between the first operation chamber and the second operation chamber;

a lock unit having a lock component between the rotors, an operation pressure being applied to the lock component from an unlock chamber, the hydraulic fluid flowing in/out the unlock chamber through the first operation chamber, the lock unit unlocking the rotation phase when the operation pressure more than or equal to an unlock pressure is applied to the lock component under a state where the rotation phase is locked by the operation pressure applied to the lock component that is less than the unlock pressure;

a control valve that controls the flow in/out of hydraulic fluid to the first operation chamber and the second operation chamber based on a control command; and a control command unit that sets the control command value, wherein the control command unit has a first stage setting block that sets a first stage command value as the control command value to introduce the hydraulic fluid to the first operation chamber under the state where the rotation phase is locked, such that the operation pressure more than or equal to the unlock pressure starts applying to the lock component, and a next stage setting block that sets a next stage command value as the control command value to introduce the hydraulic fluid to the second operation chamber, after setting the first stage command value, to maintain the applying of the operation pressure more than or equal to the unlock pressure to the lock component.

2. The valve timing control system according to claim 1, wherein
the first stage setting block sets the first stage command value under the state where the rotation phase is locked by discharging hydraulic fluid from the first operation chamber and by introducing hydraulic fluid to the second operation chamber.

3. The valve timing control system according to claim 2, wherein
the first stage setting block sets the first stage command value to hold the rotation phase by introducing hydraulic fluid to the first operation chamber and by regulating the flow in/out of hydraulic fluid to the second operation chamber.

4. The valve timing control system according to claim 1, wherein
the next stage setting block sets the next stage command value to hold the rotation phase by introducing hydraulic fluid to the second operation chamber and by regulating the flow in/out of hydraulic fluid to the first operation chamber.

5. The valve timing control system according to claim 4, wherein
the next stage setting block sets the next stage command value to a boundary value adjacent to a variable domain in which the rotation phase is changed by introducing hydraulic fluid to the second operation chamber and by discharging hydraulic fluid from the first operation chamber, of the control command value of a holding domain in which the rotation phase is maintained by introducing hydraulic fluid to the second operation chamber and by regulating the flow in/out of hydraulic fluid to the first operation chamber.

6. The valve timing control system according to claim 5, wherein after setting to the boundary value, the next stage setting block gradually changes the next stage command value in the holding domain, to a side opposite from the variable domain.

7. The valve timing control system according to claim 1, wherein
the control command unit further has a confirmation stage setting block that sets a confirmation stage command value, as the control command value to introduce hydraulic fluid to the first operation chamber, to confirm an unlocking of the rotation phase, after setting the next stage command value.

8. The valve timing control system according to claim 7, wherein
the confirmation stage setting block changes the confirmation stage command value by executing a setting change mode to gradually increase a flow rate of hydraulic fluid introduced to the first operation chamber.

9. The valve timing control system according to claim 8, wherein
the confirmation stage setting block repeats the setting change mode until the unlocking of the rotation phase is confirmed.

10. The valve timing control system according to claim 9, wherein
prior to repeating the next setting change mode, the confirmation stage setting block sets the confirmation stage command value as the control command value to introduce hydraulic fluid to the second operation chamber and to regulate the flow in/out of hydraulic fluid to the first operation chamber.

11. A control command unit that sets a control command value in a valve timing control system that variably controls valve timing of a valve opened and closed by a camshaft by a transfer of a crank torque from a crankshaft in an internal-combustion engine in response to a rotation phase of the camshaft to the crankshaft, the valve timing control system including:

a phase adjustment unit including a first operation chamber and a second operation chamber between rotors respectively rotating with the crankshaft and the camshaft, the phase adjustment unit adjusting the rotation phase by a flow in/out of hydraulic fluid to the first operation chamber and the second operation chamber, a generating direction of a torque for changing the rotation phase in response to introduction of hydraulic fluid being opposite between the first operation chamber and the second operation chamber;

a lock unit having a lock component between the rotors, an operation pressure being applied to the lock component from an unlock chamber, the hydraulic fluid flowing in/out the unlock chamber through the first operation chamber, the lock unit unlocking the rotation phase when the operation pressure more than or equal to an unlock pressure is applied to the lock component under a state where the rotation phase is locked by the operation pressure applied to the lock component that is less than the unlock pressure; and a control valve that controls the flow in/out of hydraulic fluid to the first operation chamber and the second operation chamber based on a control command value, wherein the control command unit comprising:

a first stage setting block that sets a first stage command value as the control command value to introduce the hydraulic fluid to the first operation chamber under the state where the rotation phase is locked, such that the operation pressure more than or equal to the unlock pressure starts applying to the lock component; and a next stage setting block that sets a next stage command value as the control command value to introduce the hydraulic fluid to the second operation chamber, after setting the first stage command value, to maintain the applying of the operation pressure more than or equal to the unlock pressure to the lock component.

* * * * *